US007133885B2

(12) United States Patent
Hollines, III et al.

(10) Patent No.: US 7,133,885 B2
(45) Date of Patent: Nov. 7, 2006

(54) DATABASE MANAGEMENT SYSTEM USING OFFSETS IN ENTRIES WITH AT LEAST ONE VARYING-LENGTH COLUMN

(75) Inventors: Robert J. Hollines, III, Salinas, CA (US); Christina Marie Lee, San Jose, CA (US); Robert William Lyle, Morgan Hill, CA (US); Michael R. Shadduck, Los Altos, CA (US); Julie Ann Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/304,792

(22) Filed: Nov. 26, 2002

(65) Prior Publication Data

US 2004/0103077 A1 May 27, 2004

(51) Int. Cl.
G06F 17/30 (2006.01)
(52) U.S. Cl. ...................... 707/203; 707/100
(58) Field of Classification Search ............. 707/1–10, 707/100–104.1, 200–205
See application file for complete search history.

(56) References Cited

U.S. PATENT DOCUMENTS

| 5,414,834 | A | 5/1995 | Alexander et al. ......... 395/600 |
| 6,163,775 | A | 12/2000 | Wlaschin et al. ............. 707/3 |
| 6,223,186 | B1 | 4/2001 | Rigault et al. ............. 707/104 |
| 6,279,003 | B1 | 8/2001 | Lee et al. .................. 707/100 |
| 6,279,004 | B1 | 8/2001 | Lee et al. .................. 707/100 |
| 6,343,286 | B1 | 1/2002 | Lee et al. .................... 707/3 |
| 6,567,816 | B1 * | 5/2003 | Desai et al. ............... 707/102 |

FOREIGN PATENT DOCUMENTS

| EP | 0 587 920 | 3/1994 |
| WO | 97/44745 | 11/1997 |

OTHER PUBLICATIONS

"Record architecture for a relational database management system supporting null values and Extensible tables" IBM technical disclosure bulletin, Oct. 1, 1989, vol. 32, pp. 455-458.*

* cited by examiner

*Primary Examiner*—Mohammad Ali
(74) *Attorney, Agent, or Firm*—Janet M. Skafer; Ingrid M. Foerster; André Gibbs

(57) ABSTRACT

A method, apparatus and article of manufacture, implementing the method, for operating a database management system stores information in at least one entry. Each entry is associated with a row. At least one entry comprises one or more columns. At least one of the columns has a varying length. At least one entry comprises an offset array having one or more offsets associated with the columns having the varying length. In another aspect of the invention, a column extraction table is built and used, with the offset array, to access a specified column of an entry. Alternately, code is generated to access a specified column based on the offset array of an entry. In yet another aspect of the invention, a comparison table is built and used, with the offset array, to compare subsets of the entries.

27 Claims, 20 Drawing Sheets

Set of Entries

Exemplary Entry

Generate Offset Procedure

Column Extraction Table Format

| Column Number | Begin Offset | Begin Adjustment | Length Offset 1 | Length Offset 2 | Length Adjustment |
|---|---|---|---|---|---|
| 1 | 0 | 6 | 3 | 0 | -6 |
| 2 | 3 | 0 | 0 | 0 | 10 |
| 3 | 3 | 10 | 2 | 3 | -10 |
| 4 | 2 | 0 | 0 | 0 | 5 |
| 5 | 2 | 5 | 0 | 0 | 5 |
| 6 | 2 | 10 | 1 | 2 | -15 |
| 7 | 1 | -5 | 0 | 0 | 5 |

Exemplary Column Extraction Table

Build Column Extraction Table

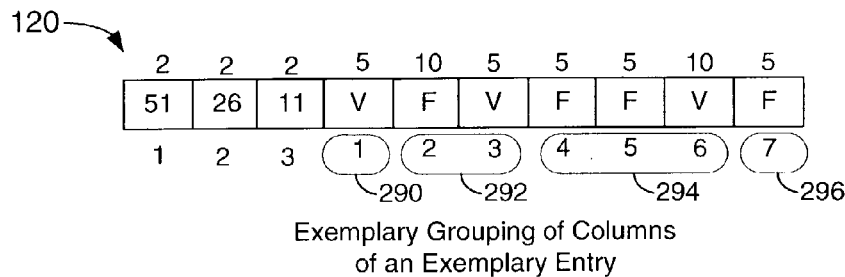
Exemplary Grouping of Columns
of an Exemplary Entry
Fig. 12
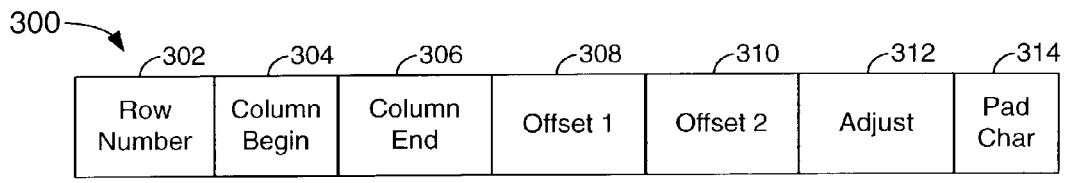
Comparison Table Format
Fig. 13
| Row Number | Column Begin | Column End | Offset 1 | Offset 2 | Adjust | Pad Char |
|---|---|---|---|---|---|---|
| 1 | 1 | 1 | 3 | 0 | -6 | 20 |
| 2 | 2 | 3 | 2 | 3 | 0 | 20 |
| 3 | 4 | 6 | 1 | 2 | -5 | 20 |
| 4 | 7 | 7 | 0 | 0 | 5 | 20 |
Fig. 14
Exemplary Comparison Table Build Comparison Table Access the Comparison Table Generate Extraction Code

DATABASE MANAGEMENT SYSTEM USING OFFSETS IN ENTRIES WITH AT LEAST ONE VARYING-LENGTH COLUMN

BACKGROUND OF THE INVENTION

1. Field of the Invention

The invention relates to a technique, specifically a method, apparatus, and article of manufacture that implements the method, which uses offsets in a database management system when an entry has at least one varying-length column. This technique is particularly, though not exclusively, suited for use within a database management system.

2. Description of the Related Art

Database management systems allow large volumes of data to be stored and accessed efficiently and conveniently in a computer system. In a database management system, data is stored in database tables which effectively organize the data into rows (data rows) and columns. A database engine responds to user commands to store and access the data.

In a database table, the columns are associated with a datatype that defines the type of data stored in that column. The datatype may be selected from a set of predefined datatypes such as numeric, integer, decimal, string, character, date, time and timestamp, among others. In a typical database management system, some datatypes assign a predefined length to a column. Such exemplary datatypes include, and are not limited to, "INTEGER," "DECIMAL," "DATE," "TIME," "TIMESTAMP," and "CHAR(N)" which allocates space for N bytes in a character column. Other datatypes store data having a varying length such as VARCHAR, Binary Large Object (BLOB), and VARGRAPHIC. A schema is a structure that describes a database table and defines the datatype for each column. The datatype information is stored as column description information.

To more quickly access the data in a database table, an index is generated based on one or more specified columns of the database table. This set of specified columns is referred to as a key or index key. Each row of the database table is associated with a key. The value of the key is determined by the values stored in the columns making up the key. In the index, the values of the keys are ordered. Each key value is associated with a least one record identifier, or pointer, to its associated row of the database table. Therefore, the keys provide access to all the rows in a database table. The database engine accesses the index to quickly locate a row of data in a database table based on the value of the key. Because the columns of a key are derived from the columns of a database table, the columns of the key are associated with a datatype, and this datatype information is stored as column description information for that index.

Typically, an index key or data row that is composed of one or more varying-length columns also contains the length of each varying-length column stored with the data of that column. The column length is used to retrieve individual column values. When an individual column, that is, a specified column, is retrieved, the index key or data row is processed sequentially from the beginning to add the lengths of previous columns to determine the position and length of the specified column. When retrieving data from an index or data row with a large number of varying-length columns, the sequential processing of the columns is slow and performance is poor. Therefore a technique is needed which improves the performance of retrieving data from an index or data row having one or more varying-length columns.

When comparing two fixed-length keys, the column lengths and total key lengths are the same for both keys. Therefore, the two fixed-length keys can be compared with one comparison and no padding of columns is required. However, when comparing two keys containing one or more varying-length columns, the lengths of the corresponding columns of each key can differ, and padding is applied to the shorter columns to make the length of the shorter columns the same as the length of the corresponding columns.

One conventional approach compares the keys one column at a time and logically pads the shorter varying-length columns to match the length of the longer columns. However, this conventional approach is slow and performance is poor. Therefore a technique is needed which improves the performance of comparing keys having at least one varying-length column.

SUMMARY OF THE INVENTION

To overcome the limitations in the prior art described above, and to overcome other limitations that will become apparent upon reading and understanding the present specification, the present invention discloses a method, apparatus, and article of manufacture for the operation of a database management system.

In accordance with the present invention, a database management system stores information in at least one entry. Each entry is associated with a row. At least one entry comprises one or more columns. At least one of the columns has a varying length. The entry comprises an offset array having one or more offsets associated with the columns having the varying length.

In another aspect of the invention, a Column Extraction Table is used, with the offset array, to access a specified column of an entry. Alternately, code is generated to access a specified column based on the offset array of an entry.

In yet another aspect of the invention, a comparison table is built and used, with the offset array, to compare subsets of the entries.

BRIEF DESCRIPTION OF THE DRAWINGS

The teachings of the present invention can be readily understood by considering the following detailed description in conjunction with the accompanying drawings, in which:

FIG. 12 depicts a grouping of columns of an exemplary entry for a Comparison Table;

FIG. 13 depicts the format of a Comparison Table stored in the memory of FIG. 1;

FIG. 14 depicts an exemplary Comparison Table for the entry of FIG. 12, and having the format of FIG. 13;

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to improve performance in substantially any database management system with database tables and indexes that contain a varying-length column. The invention is integrated as a component into a database management system. To simplify the following discussion and facilitate reader understanding, the present invention will be described in the context of use in a database management system that executes on a mainframe computer.

The term, "entry" as used herein is intended to encompass a row of a database table and a row of an index. The term, "set of entries" as used herein is intended to encompass both a database table and an index.

The present invention uses offsets in a database management system in which a set of entries has at least one varying-length column. The entries use a format that comprises an array of offsets to store position information associated with the varying-length columns, rather than store a column length with each varying-length column. The starting position of a column and the length of a varying-length column are derived from the position information in the array of offsets. In another aspect of the invention, even when the last column of an entry is not a varying-length column, the offset that is associated with the last varying-length column stores the total length of the entry, which allows the length and starting position of the last varying-length column to be derived while eliminating a need to determine the total length of an entry by sequentially processing the columns of the entry.

In another aspect of the present invention, a Column Extraction Table is used to improve the speed of accessing the columns of a set of entries. The position of the varying-length columns can change among entries; and, position information associated with the varying-length columns is stored in the offset array. The Column Extraction Table stores additional information about each column. The Column Extraction Table is used with the offset array of a specified entry to derive the starting position and length of a specified column. The same Column Extraction Table is used for all entries of a set of entries.

In yet another aspect of the invention, a Comparison Table is used to improve the speed of comparing entries or subsets of entries having at least one varying-length column.

Figure 1:
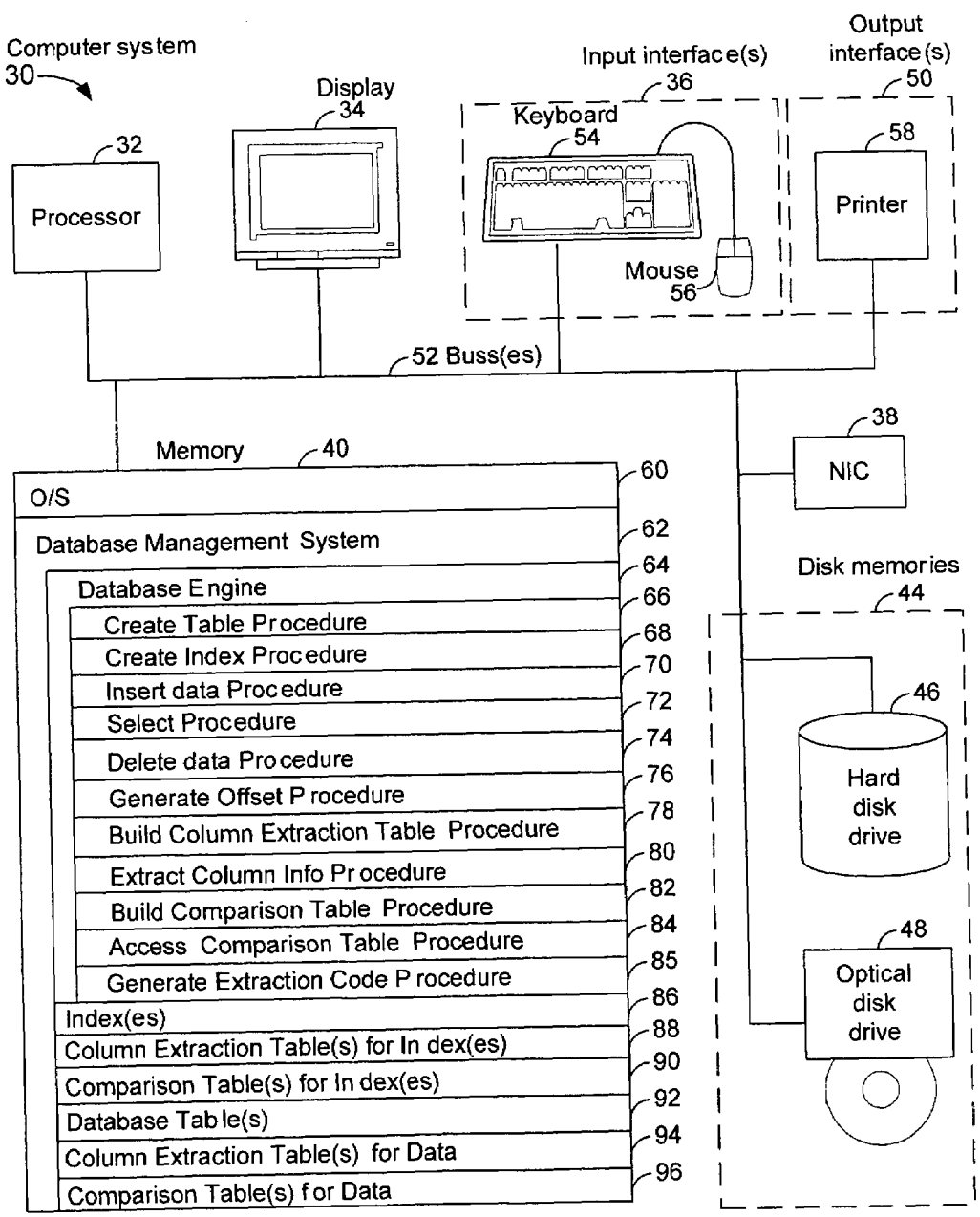
FIG. 1 depicts an illustrative computer system that uses the teachings of the present invention.

FIG. 1 depicts an illustrative computer system 30 that utilizes the teachings of the present invention. The computer system 30 comprises a processor 32, display 34, input interfaces (I/F) 36, communications interface 38, memory 40, disk memories 44 such as hard disk drive 46 and optical disk drive 48, and output interface(s) 50, all conventionally coupled by one or more busses 52. The input interfaces 36 comprise a keyboard 54 and mouse 56. The output interface is a printer 58. The communications interface 38 is a network interface card (NIC) that allows the computer 30 to communicate via a network, such as the Internet.

The memory 40 generally comprises different modalities, illustratively semiconductor memory, such as random access memory (RAM), and disk drives. The memory 40 stores operating system (O/S) 60 and application programs such as the database management system 62. The O/S 60 may be implemented by any conventional operating system, such as z/OS® (Registered Trademark of International Business Machines Corporation), AIX® (Registered Trademark of International Business Machines Corporation), UNIX® (Registered Trademark of Unix System Laboratories), and Windows NT® (Registered Trademark of Microsoft Corporation).

The database management system 62 is a DB2® system (DB2® is a registered trademark of International Business Machines Corporation). However, the inventive technique is not meant to be limited to a DB2® database management system, and may be used with other database management systems.

The specific software modules that implement the present invention are incorporated in the database management system 62. The software modules are comprised of instructions which, when loaded into the memory 40, are executed by the processor 32.

A database engine 64 allows a user to execute commands to insert data into, delete data from, or search the database tables. In one embodiment, the commands are Structured Query Language commands that conform to a Structured Query Language (SQL) standard as published by the American National Standards Institute (ANSI) or the International Standards Organization (ISO). In alternate embodiments, languages other than SQL may be used.

Generally, the database management system software, the SQL statements, and the instructions derived therefrom, are tangibly embodied in a computer-readable medium, for example, memory 40 or, more specifically, one of the disk drives 44, and are comprised of instructions which, when executed by the computer system 30, causes the computer system 30 to utilize the present invention.

In the memory 40, the database management system 62 is comprised of many software modules. A software module may comprise one or more computer programs. In one embodiment, the memory 40 may store a portion of the software modules making up the database management system 62 in semiconductor memory at any time, while other software modules are stored in disk memory. In some embodiments, the database management system 62 is comprised of the following modules:

A Create table procedure 66 creates a database table to store data in response to a create table command from a user.

A Create index procedure 68 creates an index to a specified database table in response to a create index command from a user.

An Insert procedure 70 adds data to a set of entries, that is, a database table or index, in response to an insert command from a user.

A Select procedure 72 selects specified columns from a specified database table in response to a select command from a user.

A Delete data procedure 74 deletes data from a set of entries, that is, a database table or index, in response to a delete data command from a user.

A Generate offset procedure 76 builds and populates an offset array for each entry of a set of entries.

A Build Column Extraction Table procedure 78 builds a Column Extraction Table.

An Extract column information (info) procedure 80 determines a position and length of a column based on the Column Extraction Table and offset array for an entry.

A Build Comparison Table procedure 82 builds a Comparison Table for a set of entries.

An Access Comparison Table procedure 84 compares two entries based on the Comparison Table and the offset arrays of the entries.

A Generate Extraction Code procedure 85 generates code to extract column information in an alternate embodiment of the invention.

The memory 40 also stores the following:

One or more indexes 86, having the entry format described herein, are stored in the database management system.

A Column Extraction Table for indexes 88, associated with one of the indexes 86, is stored in the database management system.

A Comparison Table for indexes 90, associated with one of the indexes 86, is stored in the database management system.

At least one database table 92 stores data in accordance with the present invention in the database management system.

A Column Extraction Table for data 94, similar to the Column Extraction Table for indexes 88, is associated with a database table 92.

A Comparison Table for data 96, similar to the Comparison Table for indexes 90, is associated with a database table.

In this description, the term, "Column Extraction Table" as used herein is intended to encompass both the Column Extraction Table for indexes 88 and the Column Extraction Table for data 94. Also, the term, "Comparison Table" as used herein is intended to encompass both the Comparison Table for indexes 90 and the Comparison Table for data 96.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Those skilled in the art will recognize many modifications may be made to this configuration without departing from the scope of the present invention.

Those skilled in the art will recognize that the exemplary computer illustrated in FIG. 1 is not intended to limit the present invention. Indeed, those skilled in the art will recognize that other alternative hardware environments may be used without departing from the scope of the present invention.

Figure 2:
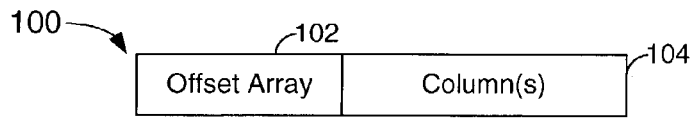
FIG. 2 depicts the format of an entry, representing a row of an index or database table of FIG. 1, which has an offset array.

FIG. 2 depicts the format of an entry 100 of a set of entries. The entry format has an offset array 102 at the start of the entry preceding a column portion 104 of the entry 100. The present inventive technique is used to insert entries that have the format comprising an offset array into a database table, and to build an index with entries having the offset array.

Figure 3:
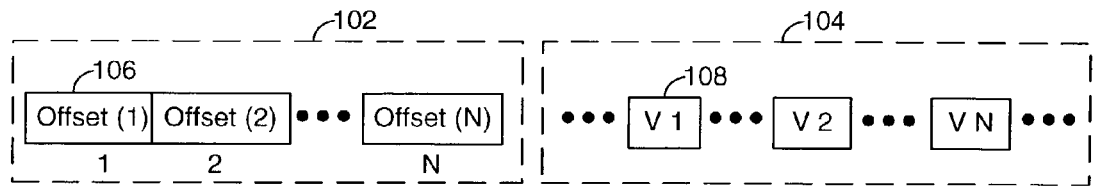
FIG. 3 depicts the entry of FIG. 2 in further detail.

FIG. 3 is a more detailed diagram of the entry format of FIG. 2. In FIG. 3, the offset array 102 has one element or offset 106 associated with each varying-length column 108. For N varying-length columns 108, there are N offsets 106. The offsets 106 provide position information about the varying-length columns 108 of an entry 100. The position information is used to access the columns. An entry 100 can have one or more varying-length columns 108. Any number of fixed-length columns may precede or follow a varying-length column. Varying-length columns may also be adjacent each other.

Figure 4:
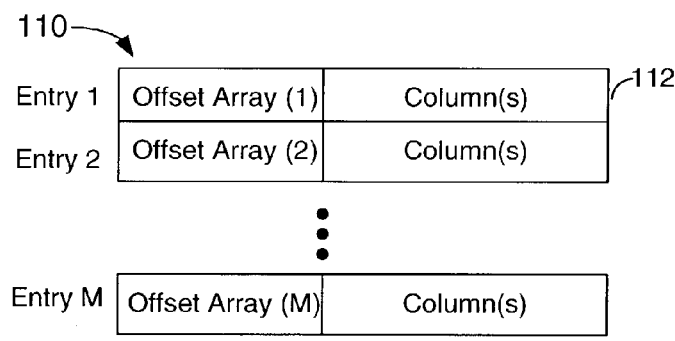
FIG. 4 depicts a set of entries, representing an index or database table of FIG. 1, having the entry format of FIGS. 2 and 3.

FIG. 4 is a diagram of a set of M entries 110. The set of entries 110 can be an index or database table. Each entry 112 is a row in the set of entries 110.

Figure 5:
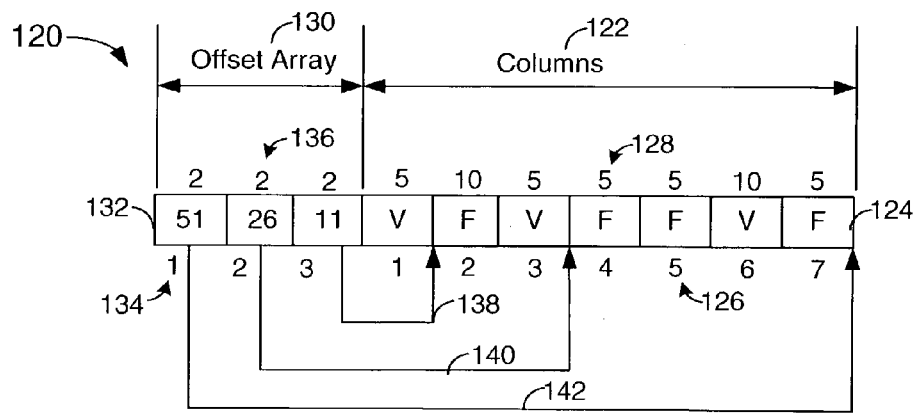
FIG. 5 depicts an exemplary entry that is stored in the memory of the computer of FIG. 1.

FIG. 5 is a diagram of an exemplary entry 120 having the format of FIGS. 2 and 3. In FIG. 5, in the column portion 122 of the entry, each block 124 represents a column. The entry 120 has seven columns which are numbered from one to seven 126 below the blocks 124. In the blocks 124, the fixed-length columns are indicated by the letter "F", and the varying-length columns are indicated by the letter "V." The numbers 128 above each block 124 represent the length of that column in bytes. Columns one, three and six are varying-length columns.

In the offset array 130, each block 132 represents an element or offset. The offset array number 134 is shown below each block 132 and the offset length 136 in bytes is shown above each block 132. Because the entry has three varying-length columns, the offset array 130 has three offsets.

The values of the offsets of the offset array will be discussed by way of example with reference to FIG. 5. An offset has a value that is equal to the position of the last byte of its associated varying-length column in the entry, except for the first offset, offset(1). The value of the first offset is equal to the total length of the entry.

For example, in FIG. 5, the last offset, offset(3), has a value equal to eleven which points to the end of the first varying-length column, as indicated by arrow 138. The value of offset(3) is determined by adding the length of the offset array (six bytes) to the length of column one (five bytes).

The second offset, offset(2) has a value equal to twenty-six which points to the end of the second varying-length column as indicated by arrow 140. The value of offset(2) is equal to the length of the offset array (six bytes) plus the length of all the columns up to and including the associated varying-length column, column three.

The first offset, offset(1), contains a value representing the total length of the entry, that is, offset(1) has a value equal to fifty-one, and points to the end of the entry, as indicated by arrow 142. Although the first offset, offset(1), is associated with the last varying-length column, the value of the first offset includes the length of any fixed length columns following the last-varying length column. In FIG. 5, since the last varying-length column (column six) is followed by a fixed-length column (column seven), the value of the first offset, offset(1) includes the length of column seven. Alternately, if the last column were a varying-length column, the first offset would point to the end of that column, and the value of the first offset would still be equal to the total length of the entry.

Even though the first offset may not always point to the end of the last varying-length column, the first offset can still be used to determine the position and length of the last varying-length column, and also to determine the total length of the entry. As a result, the number of offsets is equal to the number of varying-length columns, and an additional field to represent the total length of the entry does not need to be added to the beginning of the entry. Having the total entry length at the beginning of the entry is useful when an entire entry needs to be copied, moved or visually inspected.

Figure 6:
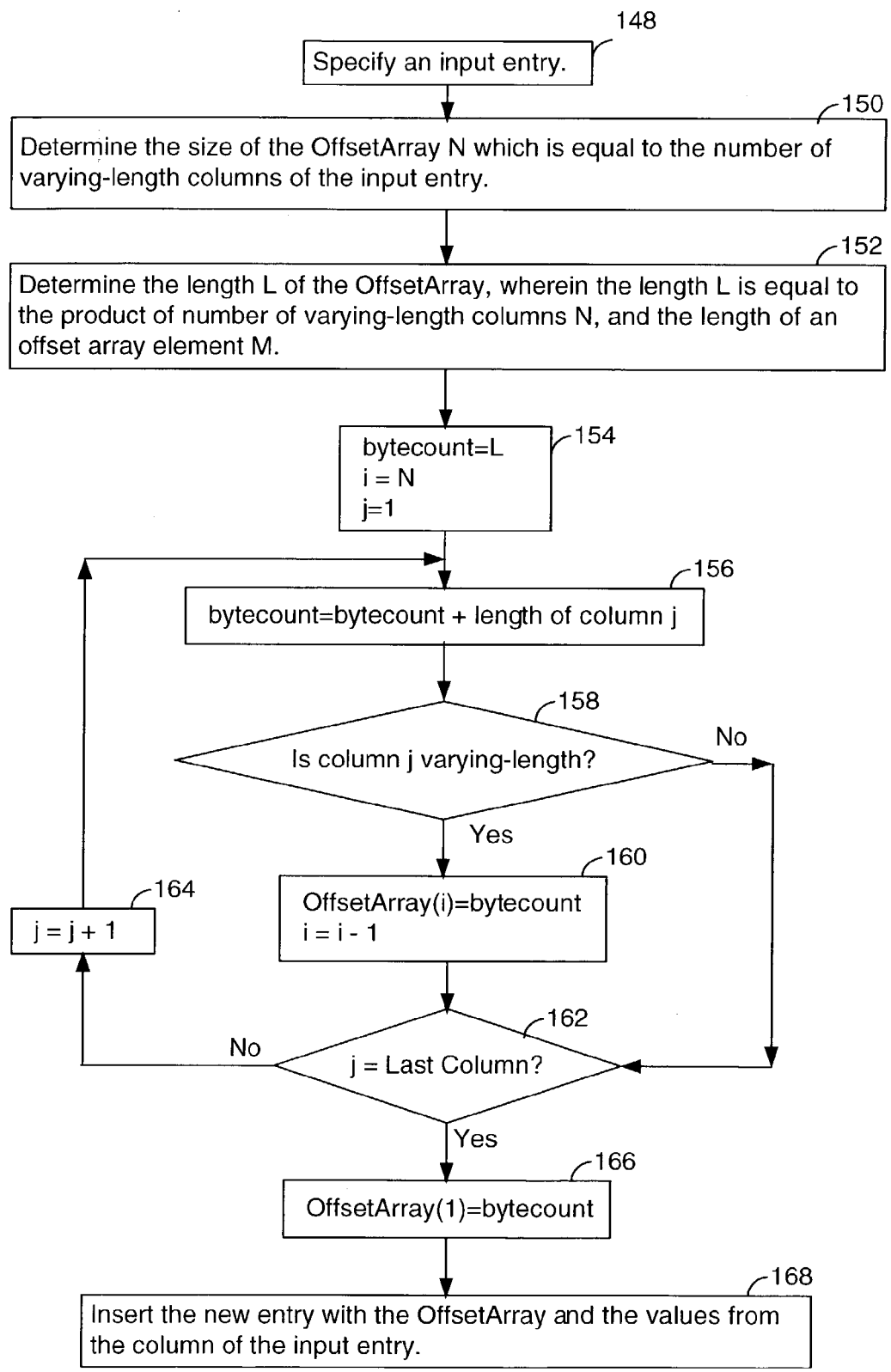
FIG. 6 depicts a flowchart of a process to generate offsets for a new entry that has the format of FIGS. 2 and 3, which is executed in the computer of FIG. 1.

FIG. 6 depicts a flowchart of a process for generating an offset array when inserting a new entry. Referring also to FIG. 1, the process of the flowchart of FIG. 6 is implemented as instructions in the Create Index procedure 68 and/or Insert data procedure 70. Alternately, the process of the flowchart of FIG. 6 is implemented as a Generate Offset procedure 76 which is called by the Create Index procedure 68 or Insert data procedure 70.

In step 148 of FIG. 6, an input entry is specified. The input entry is associated with column description information. The input entry does not have an offset array.

In step 150, the size (N) of the offset array is determined. The size (N) of the offset array is equal to the number of varying-length columns of the input entry as specified by the column description information. In step 152, the length L of the offset array is determined. The length L of the offset array is equal to the product of the number of varying-length columns N and the length of an offset array element M (L=N×M). The length M of each offset array element is a predetermined value.

Next, the values of the offset array elements for the input entry are determined. In step 154, a variable, bytecount, is used to count the number of bytes processed in the entry and is set equal to the length L of the offset array. A variable, i, represents an index into the offset array, and is set equal to the number of varying-length columns N to reference the last offset of the offset array. Another variable, j, is a column counter and is used to specify the column of the input entry that is being processed. Initially, the column counter j is set equal to one to specify the first column of the input entry.

In step 156, bytecount is incremented by the length of column j. Step 158 determines whether column j is a varying-length column. If so, in step 160, the element of the offset array, as specified by the offset array index i, is set equal to the value of bytecount, i.e., OffsetArray(i)=bytecount. In this way, an element of the offset array is set equal to a value representing the position of the last byte of an associated varying-length column. The offset array index is then decremented by one, and the process continues to step 162. If step 158 determines that column j is not a varying-length column, the process continues directly to step 162.

Step 162 determines whether column j is the last column. If not, in step 164, the column counter j is incremented by one and the process continues to step 156. If step 162 determines that column j is the last column, step 166 updates the value of the first element of the offset array to equal the total length of the entry. In other words, OffsetArray(1) is set equal to the value of bytecount. In this way, the column lengths of any fixed-length columns that follow the last varying-length column are included.

In step 168, the new entry is inserted with the values of the OffsetArray and the values from the columns of the input entry.

Column Extraction Table

To access individual column values, the database engine uses a Column Extraction Table. The Column Extraction Table has references to elements of the offset array in addition to other column information. The Column Extraction Table is a two-dimensional array, arranged in rows and columns, which is built after the column description of the entry has been defined. The Column Extraction Table is not a database table. Since the entries of the set can have varying-length columns, the starting location of any column following a varying-length column can vary. Each row of the Column Extraction Table is associated with a column in the set of entries. The Column Extraction Table has references to the offsets in the offset array, which are used to determine the position and length of a column in an entry. The same Column Extraction Table is used with all entries of a set of entries to access a specified column.

Figures 7, 8:
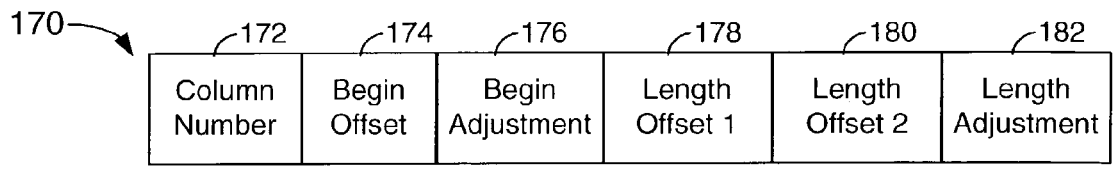
FIG. 7 depicts the format of a Column Extraction Table which is stored in the memory of the computer of FIG. 1.
FIG. 8 depicts an exemplary Column Extraction Table.

FIG. 7 depicts a format of a Column Extraction Table 170 that is stored in the memory of the computer of FIG. 1. A column of a specified entry is accessed based on the Column Extraction Table and the values in the offset array for the specified entry. The fields of the Column Extraction Table 170 comprise a Column Number 172, a Begin Offset 174, a Begin Adjustment 176, a first length offset (Length Offset 1) 178, a second length offset (Length Offset 2) 180 and a Length Adjustment 182.

The Column Number 172 of the Column Extraction Table 170 specifies the column of the entry that is being described in that row. The Begin Offset 174 and Begin Adjustment 176 are used to determine the starting position of the column specified by the column number 172. The Begin Offset 174 refers to the offset associated with the varying-length column preceding the specified column. The Begin Adjustment 176 is used to adjust the value of the Begin Offset 174 to accommodate for fixed-length columns, if any, between the position referenced by the Begin Offset 174 and the start of the specified column. In other words, the Begin Offset 174 provides an initial position to approach the start of the specified column and the Begin Adjustment 176 provides a value, which when subtracted from the value referenced by the Begin Offset, provides the starting position of the specified column.

Length Offset 1 178, Length Offset 2 180, and Length Adjustment 182 are used to determine the starting position and length of a column of an entry, and will be described below with reference to FIG. 8.

FIG. 8 depicts an exemplary Column Extraction Table 190 associated with the exemplary entry 120 of FIG. 5. The Column Extraction Table will be further explained with reference to both FIGS. 5 and 8.

The Begin Offset refers to the offset associated with the varying-length column that precedes the specified column. If no varying-length column precedes the specified column the Begin Offset is equal to zero. The Begin Adjustment is equal to the length of the offset array and/or fixed length columns between the position specified by the offset of the Begin Offset and the starting position of the specified column. The starting position of the specified column is equal to the value of the offset referenced by the Begin Offset minus the value of the Begin Adjustment. The determination of the starting position of a specified column will be now described with respect to columns one, two, three and seven of the entry 120 of FIG. 5.

Column one of the entry 120 of FIG. 5 is associated with row one 192 of the Column Extraction Table 190 of FIG. 8. Column one of the entry 120 is a varying-length column. The value of Begin Offset is equal to zero, thus no offset is referenced. The value of the Begin Adjustment is equal to six to accommodate the length of the offset array, because the starting position of column one of entry 120 (FIG. 5) is equal to six.

Column two of the entry 120 of FIG. 5 is associated with row two 194 of the Column Extraction Table 190 of FIG. 8. Column two of the entry of FIG. 5 is a fixed-length column. The value of Begin Offset is equal to three, which references or points to offset(3) of the offset array, because offset(3) is associated with the varying-length column preceding column two. The value of the Begin Adjustment is equal to zero because column two starts at byte eleven, the value stored in offset(3).

Column three of the entry 120 of FIG. 5 is associated with row three 196 of the Column Extraction Table 190 of FIG. 8. Column three of the entry 120 of FIG. 5 is a varying-length column. The value of the Begin Offset is equal to three to reference offset(3), which is the offset associated with the varying-length column that precedes column three. The value of the Begin Adjustment is equal to ten, the length of the fixed-length column (column two) which precedes column three.

Column seven of the entry 120 of FIG. 5 is associated with row seven 198 of the Column Extraction Table 190 of FIG. 8. Column seven is a fixed-length column. The value of the Begin Offset for column seven is equal to one, and the value of the Begin Adjustment is equal to a negative five, because offset(1) points to the end of column seven, and the length of column seven, five bytes, needs to be subtracted from the value of offset(1) to point to the start of column seven.

Length Offset 1, Length Offset 2 and Length Adjustment are collectively used to determine the length of a specified column. For fixed length columns, the values of Length Offset 1 and Length Offset 2 are equal to zero, and the value of the Length Adjustment is equal to the length of the specified column.

For varying-length columns, Length Offset 1 references the offset associated with the specified, or current, varying-length column. Length Offset 2 references the offset associated with the varying-length column preceding the specified column. The value of Length Adjustment is used to remove the length of any fixed-length columns between the preceding varying-length column and the start of the specified column.

Using the values from the row of the Column Extraction Table associated with a specified column, the length of a specified column varying-length is determined as follows:

the value specified by the offset referenced by
Length Offset 1–the value specified by the offset referenced by Length Offset 2 (if Length Offset 2>0)+the value of the Length Adjustment.

Length Offset 1, Length Offset 2 and the Length Adjustment will now be described for varying-length columns by way of example. In FIG. 5, column one is a varying-length column. Column one is associated with offset(3); therefore, Length Offset 1 is equal to three to reference offset(3). Since offset(3) is equal to eleven, offset (3) points to the last byte of column one. Because no varying-length columns precede column one, Length Offset 2 is equal to zero. The Length Adjustment is equal to a negative six, to remove the six bytes from the fixed-length offset array that precedes the start of column one, resulting in the length of five bytes for column one.

In another example, column three is a varying-length column. Since column three is associated with offset(2), the value of Length Offset 1 is equal to two, and offset(2) points to the end of column three. Because a varying-length column, associated with offset(3), precedes column three, the value of Length Offset 2 is equal to three. Since Length Offset 1 references the value of offset(2), which is equal to twenty-six, and Length Offset 2 references the value of offset(3), which is equal to eleven, to determine the length of column three, the value of the Length Adjustment is equal to minus ten to remove the length of column two. In other words, to determine the length of column three, the length of any fixed-length columns, in this case column two, between the values referenced by Length Offset 1 and Length Offset 2 is removed. Therefore, the length of a column is equal to the value of the offset referenced by Length Offset 1 minus the value of the offset referenced by Length Offset 2 plus the Length Adjustment.

Figure 9:
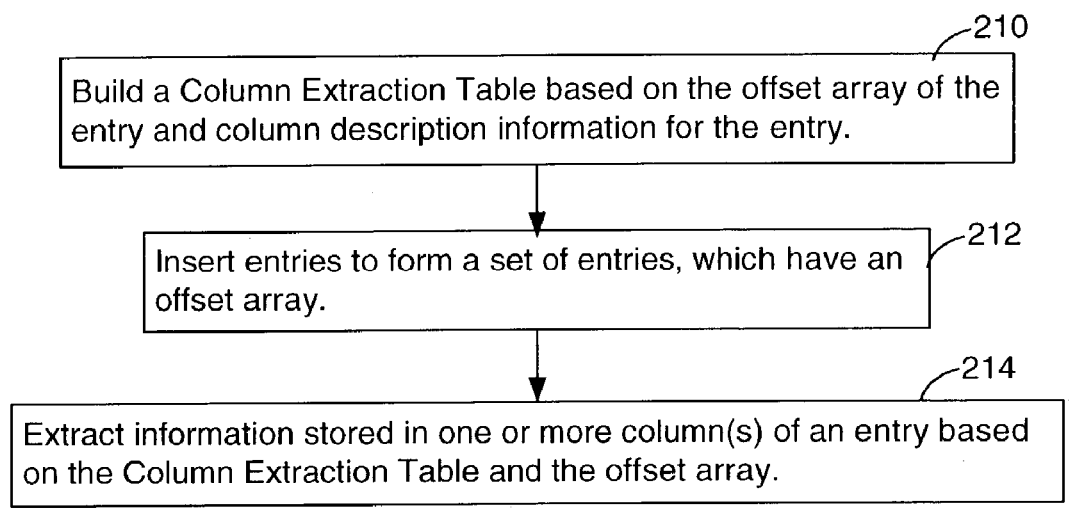
FIG. 9 depicts a high-level flowchart of a process of building and using a Column Extraction Table, which is executed in the computer of FIG. 1.

FIG. 9 depicts a high-level flowchart of a process of building and using a Column Extraction Table. In step 210, a Column Extraction Table is built in memory based on the offset array and column description information for the entry. In one embodiment, the Build Column Extraction Table procedure 78 of FIG. 1 is performed in step 210. In step 212, entries, having an offset array, are inserted to form a set of entries. In one embodiment, step 212 performs the Generate Offset procedure 76 of FIG. 1. Alternately, step 212 is performed prior to step 210.

In step 214, the information stored in one or more columns of an entry of the set of entries is extracted based on the Column Extraction Table and the offset array. In particular, to extract information from a specified column of a specified entry, the starting position and length of the specified column is determined based on the Column Extraction Table and the offset array of the specified entry. In one embodiment, step 214 performs the Extract Column Info procedure 80 of FIG. 1.

Figure 10A:
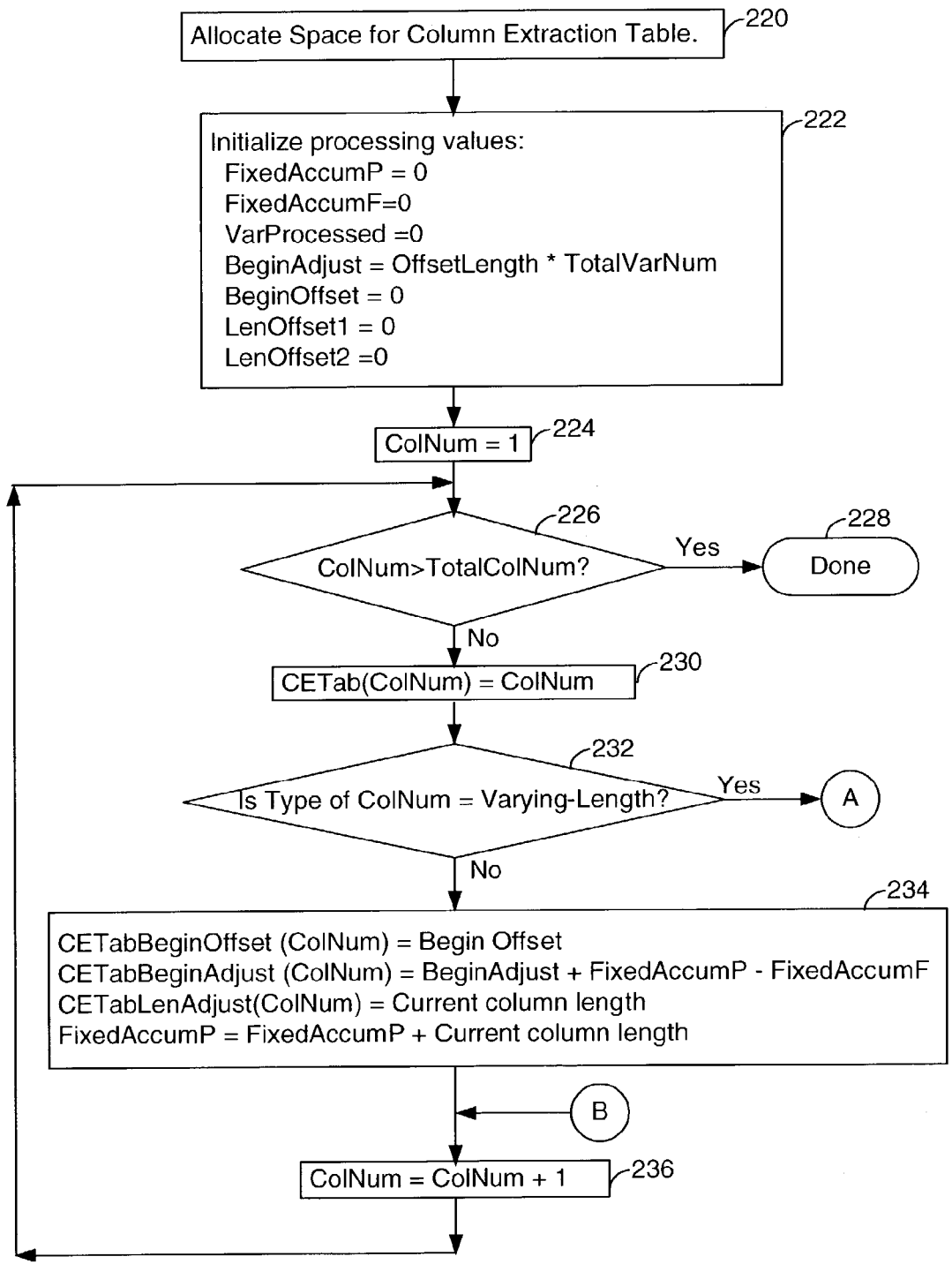
FIGS. 10A and 10B collectively depict a flowchart of a process to build the Column Extraction Table of FIG. 7, which is executed in the computer of FIG. 1.
Figure 10B:
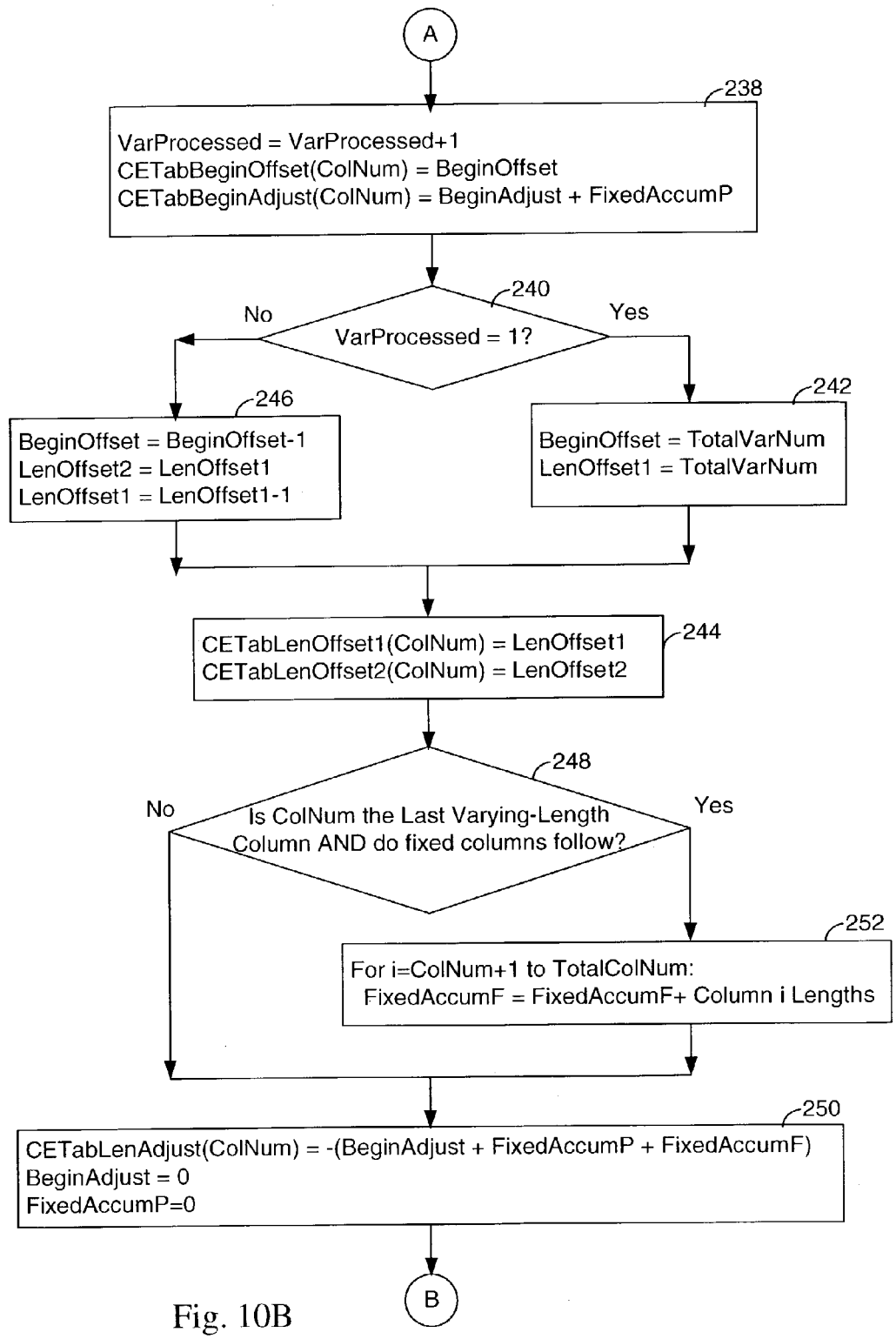

FIGS. 10A and 10B collectively depict a flowchart of a process, used in step 210 of FIG. 9, to build the Column Extraction Table of FIG. 8. Referring also to FIG. 1, in one embodiment, the process of FIGS. 10A and 10B is implemented by the Build Column Extraction Table procedure 78 of FIG. 1, and is executed in the computer 30 of FIG. 1. The Build Column Extraction Table procedure 78 is invoked when a set of entries is first accessed. For example, a user's select command will cause the select procedure to access a set of entries, and thereby invoke the Build Column Extraction Table procedure 78 of FIG. 1.

In step 220, space is allocated for the Column Extraction Table based on, in part, the number of columns in a specified entry, and that space is initialized with zeroes.

In step 222, variables used in the process of generating the Column Extraction Table are initialized. A variable to accumulate the sum of the lengths of the fixed length columns preceding the varying-length column, FixedAccumP, is set equal to zero. A variable to accumulate the sum of the lengths of any fixed columns following the last varying-length, FixedAccumF, is set equal to zero. A variable to count a number of varying-length columns that have been processed, VarProcessed, is set equal to zero. A beginning adjustment value, BeginAdjust, is set equal to the product of the Offset Length and TotalVarNum, the total number of varying-length columns. A beginning offset index, BeginOffset, is initialized to zero. The offset indices for an entry, LenOffset1 and LenOffset2, are also initialized to zero.

In step 224, a column counter, ColNum, is set equal to one to point to the first column. In step 226 if the value of the column counter, ColNum, is greater than the total number of columns in the entry, TotalColNum, the process ends (step 228). If not, in step 230, the value of column number of the Column Extraction Table, CETabColNum(ColNum), is set equal to the value of ColNum.

In step 232, the process determines if the type of column specified by ColNum is varying-length. If not, the specified column is fixed-length, and, in step 234, the Column Extraction Table values for that column are updated. The value of the Begin Offset for ColNum, CETabBeginOffset(ColNum), is set equal to Begin Offset. The value of the Begin Adjustment for ColNum, CETabBeginAdjust(ColNum), is set equal to the value of BeginAdjust plus FixedAccumP minus FixedAccunF. The Length Adjustment for ColNum, CETabLenAdjust(ColNum), is set equal to the length of the specified column. The value of FixedAccumP is set equal to the sum of the current value of FixedAccumP plus the length of the specified column. The values of length offsets 1 and 2, CETabLenOffset1 and CETabLenOffset2, respectively, are already equal to zero because, when space was allocated for the Column Extraction Table, that space was initialized with zeroes. Alternately, step 234 also sets the values of Length Offsets 1 and 2, CETabLenOffset1(ColNum) and CETabLenOffset2(ColNum), respectively, equal to zero.

In step 236, the column pointer, ColNum is incremented by one to point to the next column, and the process repeats at step 226.

If, in step 232, the type of column for ColNum is varying-length, in step 238 (FIG. 10B), the number of varying-length columns, VarProcessed, is incremented by one. The information from which to derive the starting position of the column is determined. The Column Extraction Table Begin Offset value, CETabBeginOffset(ColNum), is set equal to Begin Offset. The Column Extraction Table Begin Adjustment, CETabBeginAdjust(ColNum) is set equal to the sum of BeginAdjust and FixedAccumP.

Next, the process will determine and update the values of Length Offset 1, Length Offset 2, and the Length Adjustment of the Column Extraction Table for the specified varying-length column.

Step 240 determines whether the number of varying-length columns processed, VarProcessed, is equal to one. If so, in step 242, Begin Offset is set equal to the total number of varying-length columns, TotalVarNum; and, the length offset 1 variable, LenOffset1, is set equal to the total number of varying-length columns, TotalVarNum, and the process continues to step 244. At this point, the length offset 2 variable, LenOffset2, is equal to zero and is not changed.

If, in step 240, the number of varying-length columns processed, VarProcessed, is not equal to one, in step 246, Begin Offset is decremented by one. LenOffset2 is set equal to LenOffset1, the offset associated with the preceding varying-length column. LenOffset1 is decremented by one to point to the offset associated with the next varying-length column, and the process continues to step 244.

In step 244, the values of the length offsets are updated in the Column Extraction Table for the specified column. The value of Column Extraction Table length offset 1, CETableLenOffset1 (ColNum), is set equal to the value of the variable LenOffset1; and the value of Column Extraction Table length offset 2, CETabLenOffset2(ColNum), is set equal to the value of the variable LenOffset2.

Next the length adjustment is determined and updated. In step 248, if the column specified by ColNum is not the last varying-length column or if that column is the last varying-length column and no fixed-length columns follow, the process continues to step 250. If the column specified by ColNum is the last varying-length column and fixed columns follow, the process continues to step 252.

In step 252, the lengths of the fixed-length columns that follow the specified column are summed as follows: Starting at a counter i being equal to the value of ColNum plus one, and incrementing counter i by one to reach the total number of columns, TotalColNum: FixedAccumF is set equal to FixedAccumF plus the length of column i.

In step 250, the Column Extraction Table length adjustment, CETabLenAdjust(ColNum) is set equal to minus the sum of BeginAdjust, FixedAccumP and FixedAccumF. BeginAdjust and FixedAccumP are then set equal to zero, and the process continues to step 236 (FIG. 10A).

The following exemplary pseudo-code builds the Column Extraction Table for a specified entry or set of entries, and in one embodiment, is implemented in the build Column Extraction Table procedure 78 of FIG. 1.

| Definition of Column Extraction Table Columns | |
|---|---|
| CETabColNum | = Column Number |
| CETabBeginOffset | = Column Extraction Table Beginning Offset Index |
| CETabBeginAdjust | = Column Extraction Table Begin Adjustment |
| CETabLenOffset1 | = Column Extraction Table Length Offset Index 1 |
| CETabLenOffset2 | = Column Extraction Table Length Offset Index 2 |
| CETabLenAdjust | = Column Extraction Table Length Adjustment |
| Local Variables | |
| ColNum | = Column Counter to provide a specified column number |
| BeginAdjust | = Beginning adjustment value |
| BeginOffset | = Beginning offset index |
| LenOffset1 | = Entry's offset index #1 |
| LenOffset2 | = Entry's offset index #2 |
| FixedAccumF | = Accumulation of the lengths of the fixed columns following the last varying-length column |
| FixedAccumP | = Accumulation of the lengths of the fixed columns preceding the current varying-length column, as specified by ColNum |
| OffsetLength | = Length of the offset array element of the entry |
| TotalColNum | = Total number of columns in entry |
| TotalVarNum | = Total number of varying-length columns in entry |
| VarProcessed | = Number of varying-length columns processed |
| Table size | = TotalVarNum * table entry length |

Allocate and clear storage for the Column Extraction Table, CETab

Initialize processing values

FixedAccumP=0

FixedAccumF=0 arProcessed=0

BeginAdjust=OffsetLength*TotalVarNum

BeginOffset=0

LenOffset1=0

LenOffset2=0

Process each current column and create a row in the Column Extraction Table:

```
Do ColNum = 1 to TotalColNum
    CETabColNum(ColNum) = ColNum
    If current column as specified by ColNum is varying-length
    Then Do
        VarProcessed = VarProcessed + 1
        CETabBeginOffset(ColNum) = BeginOffset
        CETabBeginAdjust(ColNum) = BeginAdjust + FixedAccumP
        If VarProcessed = 1 Then Do
            BeginOffset = TotalVarNum
            LenOffset1 = TotalVarNum
        End
        Else Do
            BeginOffset = BeginOffset -1
            LenOffset2 = LenOffset1
            LenOffset1 = LenOffset1 -1
        End
        CETabLenOffset1(ColNum) = LenOffset1
        CETabLenOffset2(ColNum) = LenOffset2
        If ColNum specifies the last varying-length column
        AND fixed columns
            follow Then Do
                Loop through the fixed columns past the last
                varying-length
                    column to sum the column lengths
                FixedAccumF = the sum of the column lengths
        End
        CETabLenAdjust(ColNum) = - ( BeginAdjust +
                                FixedAccumP + FixedAccumF )
        BeginAdjust = 0
        FixedAccumP = 0
    End
    Else Do - Processing a fixed length column
        CETabBeginOffset(ColNum) = BeginOffset
        CETabBeginAdjust(ColNum)=BeginAdjust+
        FixedAccumP-FixedAccumF
        CETabLenAdjust(ColNum) = Current column length
        FixedAccumP = FixedAccumP + Current column length
    End
End
```

Figure 11:
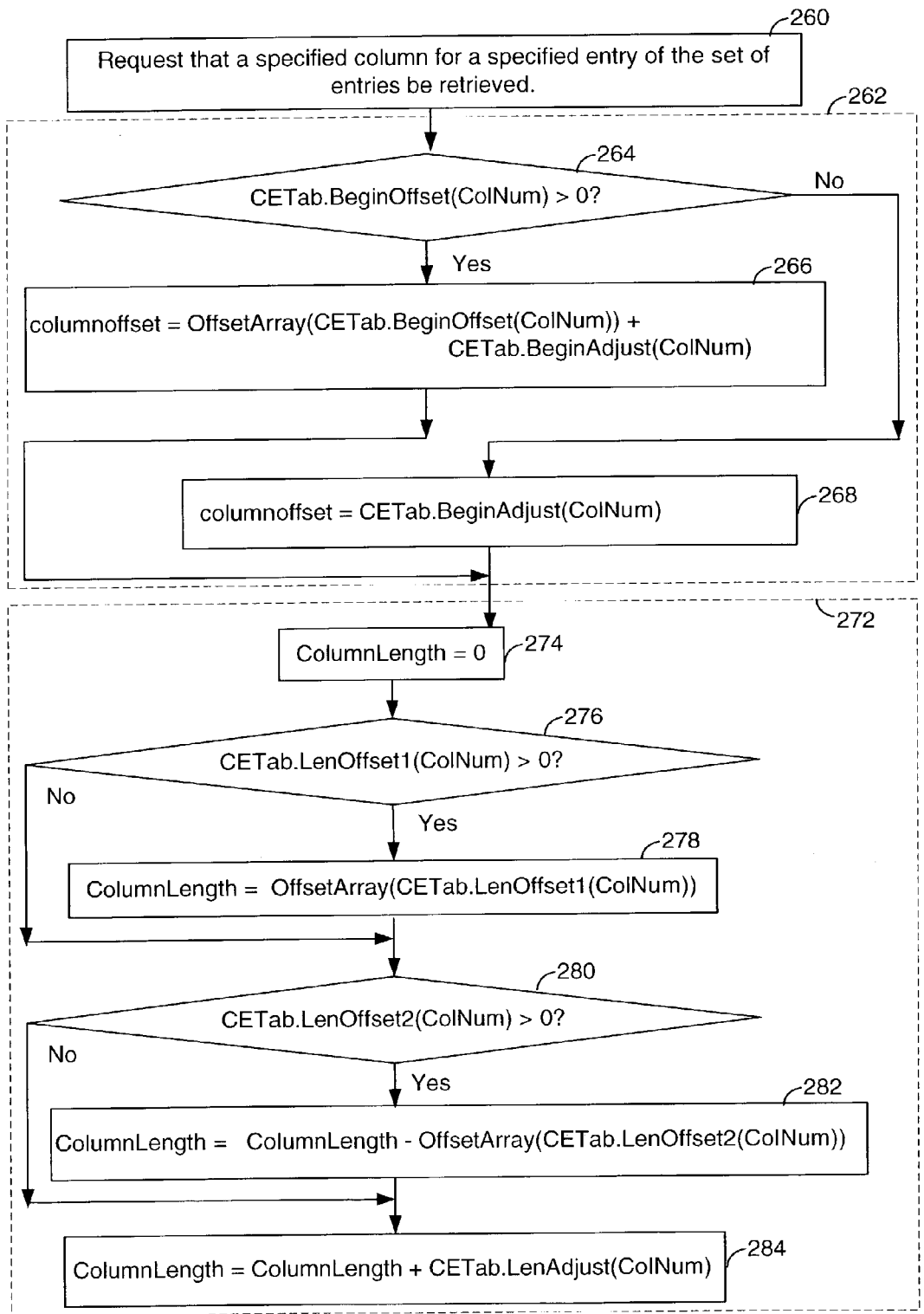
FIG. 11 depicts a flowchart of a process to extract column information, which is executed in the computer of FIG. 1, based on the Column Extraction Table of FIG. 7.

FIG. 11 depicts a flowchart of a process to extract the column position and length based on the Column Extraction Table format of FIG. 7 and the entry format of FIG. 3. Referring also to FIG. 1, in one embodiment, the process of FIG. 1I is implemented in the Extract column info procedure 80 of FIG. 1, and executed in the computer 30. The Extract column info procedure 80 is invoked by the select procedure 72 of FIG. 1.

In step 260, a request to retrieve a specified column from a specified entry of a set of entries is received.

The steps in block 262 determine the column offset, that is, the starting position of the column specified by the value of ColNum. In step 264, the process determines if the begin offset from the Column Extraction Table for the specified column number, CETab.BeginOffset(ColNum), is greater than zero. If so, in step 266, the variable, columnoffset, is set equal to the value from the offset array for the offset index specified in the Column Extraction Table begin offset plus the value of the begin adjustment, that is, columnoffset is set equal to OffsetArray(CETab.BeginOffset(ColNum))+CETabBeginAdjust(ColNum).

If step 264 determines that the begin offset for the specified column number, CETab.BeginOffset(ColNum), is not greater than zero, in step 268, the variable, columnoffset, is set equal to the value of the Column Extraction Table begin adjustment for that column, CETab.BeginAdjust(ColNum).

The steps in block 272 determine the length of the column that is specified by the value of ColNum. In step 274, a variable storing a column length, ColumnLength, is set equal to zero. In step 276, the process determines whether the value of Length Offset 1, CETab.LenOffset1 (ColNum), from the Column Extraction Table for the specified column number is greater than zero. If so, in step 278, the ColumnLength is set equal to the value of the offset of the offset array referenced by the value of length offset 1 that is stored in the Column Extraction Table. In other words, the ColumnLength is equal to OffsetArray(CETab.LenOffset1(ColNum)). In step 276, if the value of length offset 1, CETab.LenOffset1(ColNum), is not greater than zero, the process continues to step 280.

In step 280, the process determines whether the value of length offset 2, (CETab.LenOffset2(ColNum)), from the Column Extraction Table for the specified column number is greater than zero. If so, in step 282, the ColumnLength is modified as follows:

ColumnLength=ColumnLength−OffsetArray(CETab.LengthOffset2(ColNum).

If, in step 280, the value of length offset 2 is not greater than zero, the process continues to step 284.

In step 284, value of ColumnLength is modified by the length adjustment from the Column Extraction Table to determine its final value as follows:

ColumnLength=ColumnLength+CETab.LenAdjust (ColNum).

The following exemplary pseudo-code extracts the column offset (ColumnOffset) and the column length (ColumnLength) for specified column of a specified entry from the Column Extraction Table. In one embodiment, this pseudo-code is implemented in the Extract Column Info Procedure 80 of FIG. 1, and executed in the computer 30 of FIG. 1. The column offset is the starting position of the specified column.

```
ColNum      = Specifies the column
OffsetArray = The OffsetArray for the specified entry
If CETab.BeginOffset(ColNum) > 0 Then
    ColumnOffset = OffsetArray(CETab.BeginOffset(ColNum) +
              CETab.BeginAdjust(ColNum)
Else
    ColumnOffset = CETab.BeginAdjust(ColNum)
ColumnLength = 0
If CETab.LenOffset1(ColNum) > 0 Then
    ColumnLength = OffsetArray(CETab.LenOffset1(ColNum))
If CETab.LenOffset2(ColNum) > 0 Then
    ColumnLength = ColumnLength −
        (OffsetArray(CETab.LenOffset2(ColNum)))
ColumnLength = ColumnLength + CETab.LengthAdjust(ColNum)
```

In the following example, applying the pseudo-code above, the column offset and column length for column six of the entry of FIG. 5 is determined based on the Column Extraction Table of FIG. 8 as follows.

To determine the column offset: Since ColNum is greater than zero:

$$ColumnOffset = OffsetArray(CETab.BeginOffset(6)) + CETab.BeginAdjustment(6)$$

$$= OffsetArray(2) + 10$$

-continued $$= 26 + 10$$
$$= 36$$

To determine the ColumnLength:

Since $CETab.LenOffset1(6)$ is equal to one, and therefore is greater than zero, then $$ColumnLength = OffsetArray(CETab.LengthOffset1(6))$$
$$= OffsetArray(1)$$
$$= 51$$

Since $CETab.LenOffset2(6)$ is equal to two, and therefore is greater than zero, then $$ColumnLength = ColumnLength - (OffsetArray(CETab.LenOffset2(6))$$
$$= 51 - (OffsetArray(2))$$
$$= 51 - (26)$$
$$= 25$$

$$ColumnLength = ColumnLength + CETab.LengthAdjust(6)$$
$$= 25 - 15$$
$$= 10$$

In an alternate embodiment, the Column Extraction Table has a flag that indicates whether a column is varying-length or fixed-length, rather than having Length Offset 2. In this embodiment, to build the Column Extraction Table, the flowchart of FIGS. 10A and 10B is modified. Step 222 does not set LenOffset2 equal to zero. Step 238 also sets a flag, CETabVarColFlag(ColNum), to "Yes" to indicate that a column has a varying-length. If step 232 determines that the column, as specified by ColNum, has a fixed-length, step 234 sets the flag, CETabVarColFlag(ColNum), to "No" to indicate that the column has a fixed-length. Steps 246 and 244 do not update LenOffset2 and CETabLenOffset2(ColNum), respectively.

To determine the position and length of a specified column in this embodiment, FIG. 11 is also modified. Step 280 is modified to determine whether the value of CETab.BeginOffset(ColNum) is greater than zero, rather than CETab.LenOffset2(ColNum). Step 282 is modified to determine the column length for the varying-length column as follows:

ColumnLength=ColumnLength−OffsetArray(CETab.BeginOffset(ColNum)).

Between block 262 (after step 268) and block 272, a step is added to determine whether the flag, CETabVarColFlag(ColNum), is equal to "Yes" which indicates that the specified column, ColNum, is a varying-length column. If so, the process continues to step 274 of block 272. If the flag, CETabVarColFlag(ColNum), is not equal to "Yes", then the specified column, ColNum, is a fixed-length column and the column length is determined as follows:

ColumnLength=CETab.LenAdjust(ColNum).

Comparison Table

The Comparison Table is used to improve the speed of comparing entries or portions of entries by allowing groups of adjacent columns to be compared. To describe each group, the Comparison Table references the offsets of an entry and stores other information about the group.

The Comparison Table is built after the definition, that is, the column description information, for an index or database table has been created. In the Comparison Table, groups of adjacent columns, or subsets, are formed. The comparison of groups proceeds from left to right, padding as needed to maintain equal length groups.

FIG. 12 depicts an exemplary grouping of the columns of the entry of FIG. 5. Adjacent columns are grouped such that each column has at most one varying-length column and the varying-length column is the last column of the group.

The groups are indicated by ovals surrounding the column numbers. Group one 290 is comprised of a single column that has a varying-length. Group two 292 is comprised of columns two and three. Group three 294 is comprised of columns four, five and six. Group four 296 has a single fixed length column—column seven.

FIG. 13 depicts the format of a row 300 of a Comparison Table. The Comparison Table is a two-dimensional array which is organized into rows and columns, and is not a database table.

Each row of the Comparison Table comprises a row number 302, a column begin (Column Begin) 304, a column end (Column End) 306, first offset (Offset 1) 308, second offset (Offset 2) 310, a length adjustment (Adjust) 312, and a padding character (PadChar) 314. The row number 302 specifies the group number. Column Begin 304 specifies the starting column of a group. Column End 306 specifies the ending column of a group. The first and second offsets, Offset 1 and Offset 2, 308 and 310, respectively, are offset indexes. The first offset 308, Offset 1, references the offset associated with the varying-length column of the current group as specified by the group number. If a group does not have a varying-length column, the first offset, Offset 1, is set equal to zero. The second offset 310, Offset 2, references the offset associated with the varying-length column preceding the current group. Adjust 312 is an adjustment value to accommodate for the length of fixed-length columns and/or the length of the offset array, and is used to determine the length of a group. PadChar 314 specifies the character to be used for padding a group.

The Comparison Table does not contain information to determine the position of a particular group. A technique that uses the Comparison Table to compare entries determines the starting position of the first group and tracks the position of successive groups during the comparison.

FIG. 14 depicts an exemplary Comparison Table 320 based on the entry of FIG. 12. Because the entry 120 of FIG. 12 has four groups, the Comparison Table 320 of FIG. 14 has four rows. For example, for group one of FIG. 12, in row one of the Comparison Table of FIG. 14, Column Begin is equal to one and Column End is equal to one because group one comprises column one. The first offset, Offset 1, is equal to three which points to the end of column one. The second offset, Offset 2, is equal to zero. The adjustment is equal to a negative six which is used to remove the length of the offset array from the length of the group as specified by Offset 1. The padding character, PadChar, is equal to 20, which represents a blank character in ASCII.

Figure 15:
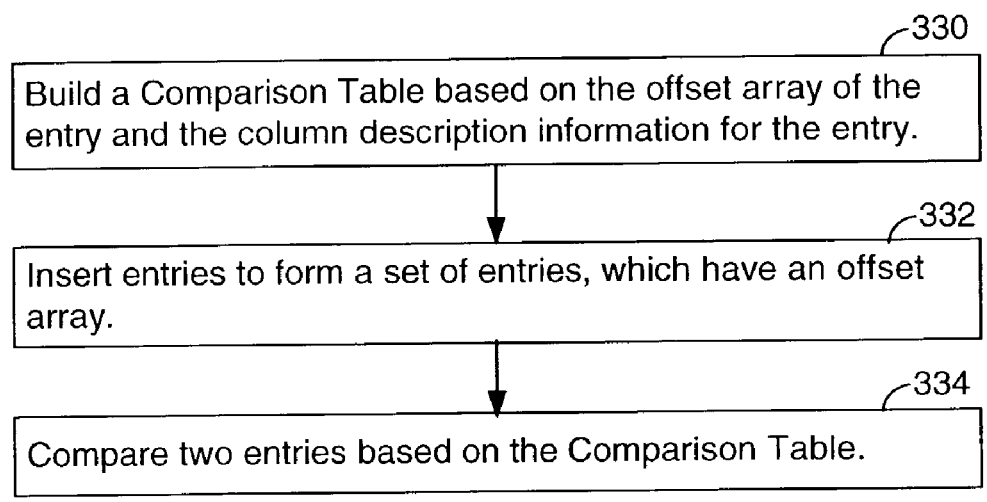
FIG. 15 depicts a high-level flowchart of a general process that builds and uses of the Comparison Table of FIG. 13, which is executed in the computer of FIG. 1.

FIG. 15 depicts a high-level flowchart of a general process or processes that build and use the Comparison Table of FIG. 13. In step 330, a Comparison Table is built based on the offset array of an entry and the column description information for the entry. In one embodiment, the Comparison Table is built using the Build Comparison Table procedure 82 of FIG. 1. In step 332, entries are inserted to form a set of entries which have an offset array. In one embodiment, step 332 invokes the Generate Offset procedure 76 of FIG. 1. In step 334, two entries are compared based on the Comparison Table. In one embodiment, the Access Comparison Table procedure 84 of FIG. 1 accesses the Comparison Table. The Access Comparison Table procedure 84 of FIG. 1 is invoked in response to any one of the insert, delete or select procedures. In an alternate embodiment, step 332, which inserts entries, is performed prior to step 330, which builds the Comparison Table.

Figure 16A:
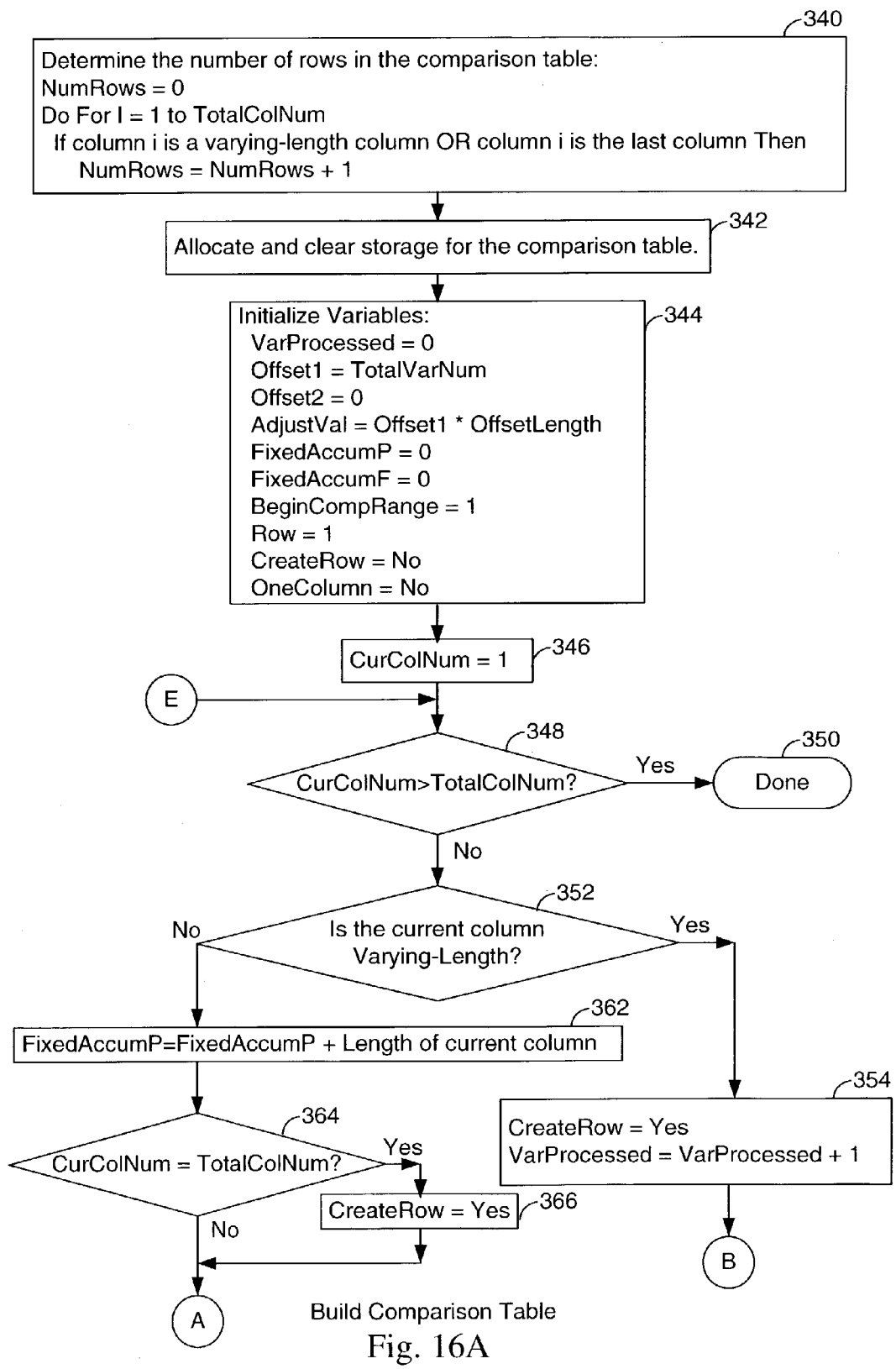
FIGS. 16A, 16B and 16C collectively depict a flowchart of a process that builds the Comparison Table of FIG. 13, which is executed in the computer of FIG. 1.
Figure 16B:
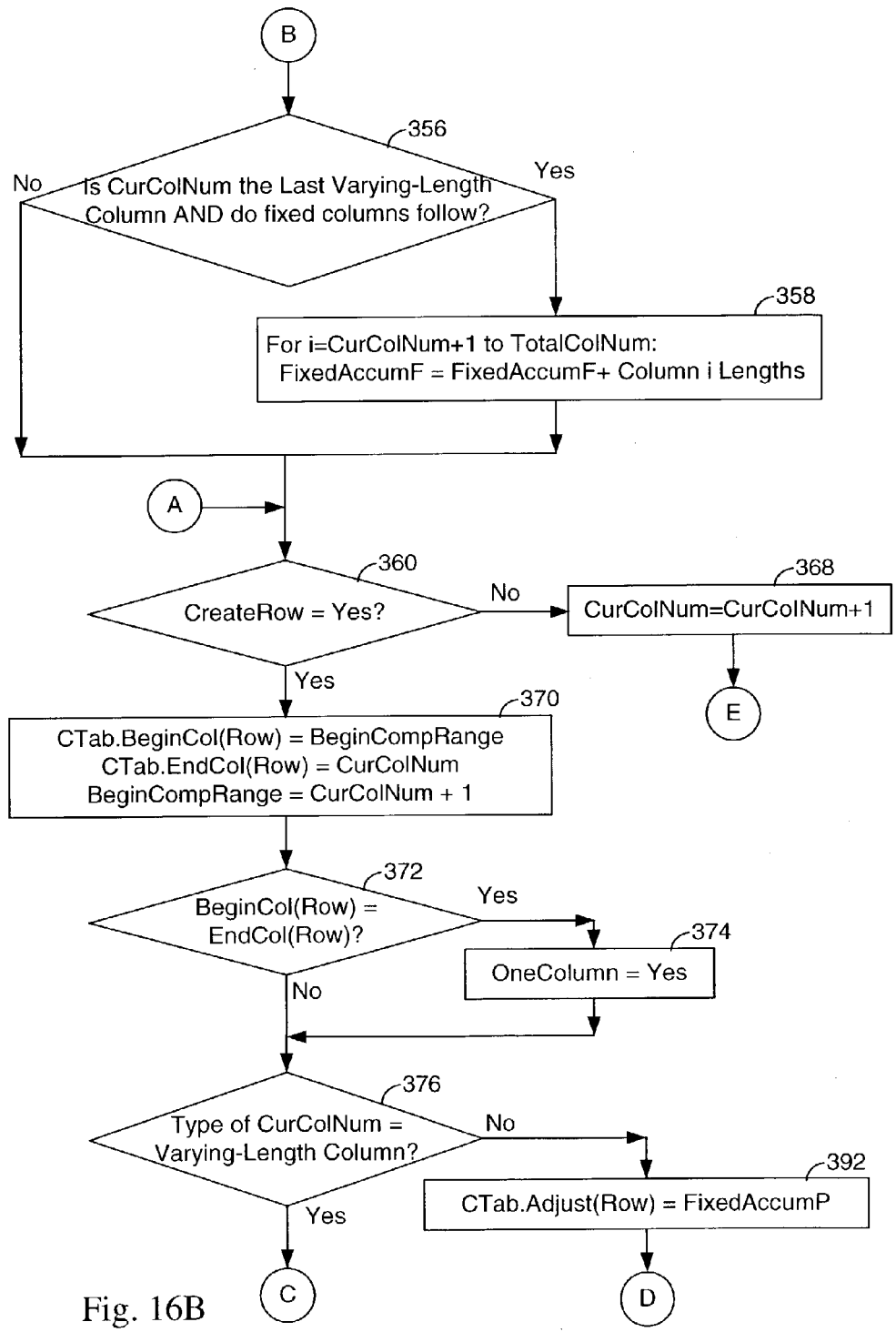
Figure 16C:
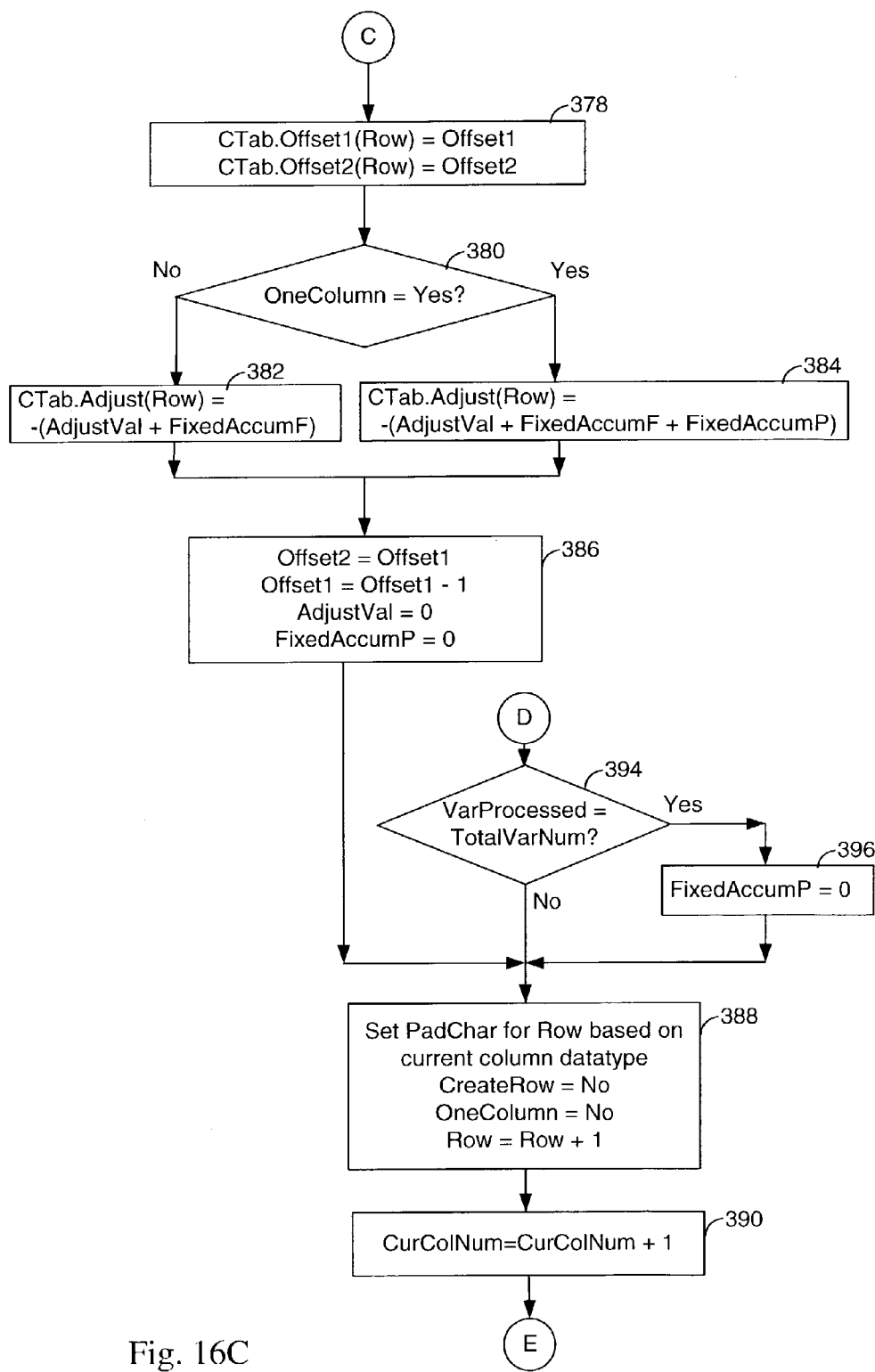

FIGS. 16A, 16B and 16C collectively depict a flowchart of a process that builds a Comparison Table using the format of FIG. 13. In one embodiment, the Build Comparison Table procedure 82, which is executed in the computer 30 of FIG. 1, implements the flowchart of FIGS. 16A, 16B and 16C. The Build Comparison Table procedure 82 (FIG. 1) is invoked when a set of entries is accessed, for example, during any one of the select, insert or delete procedures, 72, 70 and 74 (FIG. 1), respectively.

In step 340, the total number of rows or groups to be stored in the Comparison Table is determined based on the specified entry. A variable called NumRows, which is used as a group counter, is set equal to zero. For each column i to the total number of columns of the specified entry: if a column i is a varying-length column or is the last column, then NumRows is incremented by one.

Step 342 allocates and clears storage for the Comparison Table, CTab; therefore, the values in the Comparison Table are initialized to zero.

In step 344, variables are initialized as follows:
VarProcessed=0
Offset1=TotalVarNum
Offset2=0
AdjustVal=Offset1*OffsetLength
FixedAccumP=0
FixedAccumF=0
BeginCompRange=1
Row=1
CreateRow=No
OneColumn=No.

In step 346, a current column number, CurColNum, is set equal to 1. CurColNum is the column number of the entry which is being processed.

In step 348, if the value of the current column number, CurColNum, is greater than the total number of columns, TotalColNum, the process ends (step 350). If the value of the current column number, CurColNum, is not greater than the total number of columns, step 352 determines whether the current column, specified by CurColNum, is varying-length. In one embodiment, step 352 determines whether the current column is varying-length from its datatype. If so, in step 354, a CreateRow variable is set to Yes, VarProcessed is incremented by one, and the process continues to step 356 of FIG. 16B.

Step 356 determines whether the current column number, CurColNum, is the last varying-length column and whether any fixed-length columns follow the varying-length column. If so, step 358 sums the lengths of any fixed columns that follow the last varying-length column, and stores that sum in the variable called FixedAccumF. The process continues to step 360.

If, in step 356, the current column number, CurColNum, is not the last varying-length column, or no fixed-length columns follow the last varying-length column the process continues to step 360.

If step 352 (FIG. 16A) determines that the current column, as specified by CurColNum, is not varying-length, in step 362, the variable, FixedAccumP is incremented by the length of the current column.

Step 364 determines whether the current column number, CurColNum, is equal to the last column number, LastColNum. If so, in step 366, the variable CreateRow is set to Yes. If not the process continues to step 360 (FIG. 16B).

Step 360 determines whether the variable, CreateRow, is equal to Yes. If not, step 368 increments the current column number, CurColNum, by one, and continues to step 348. If CreateRow is equal to Yes, in step 370, the specified row of the Comparison Table is updated with the Beginning and Ending columns of the group. CTab.BeginCol(Row) is set equal to BeginCompRange, and CTab.EndCol(Row) is set equal to CurColNum. The variable, BeginCompRange, is set equal to the current column number plus one.

Step 372 determines whether the group has a single column. If CTab.BeginCol(Row) is equal to CTab.EndCol(Row), then in step 374, the variable, OneColumn, is set equal to Yes and the process continues to step 376. If CTab.BeginCol(Row) is not equal to CTab.EndCol(Row), the process continues to step 376.

Step 376 determines whether the current column is varying-length. If so, the process continues to step 378 (FIG. 16C). Step 378 updates the first and second offsets of the Comparison Table. In particular, CTab.Offset1(Row) is set equal to Offset1, and CTab.Offset2(Row) is set equal to Offset2.

Step 380 determines whether the variable, OneColumn, is equal to Yes. If not, the group has more than one column and, in step 382, the adjustment column of the Comparison Table is updated as follows: CTab.Adjust(Row)=−(AdjustVal+FixedAccumF), and the process continues to step 386. If OneColumn is equal to Yes, the group has only one column, and in step 384, the adjustment column of the Comparison Table is updated as follows: CTab.Adjust(Row)=−(AdjustVal+FixedAccumF+FixedAccumP), and the process continues to step 386.

In step 386, the value of Offset2 is set equal to the value of Offset 1, the value of Offset1 is decremented by one, AdjustVal is set equal to zero, and FixedAccumP is set equal to zero.

In step 388, the padding character is set for the row based on the datatype of the current column. CreateRow is set equal to No, OneColumn is set equal to No, and Row is incremented by one to process the next row.

In step 390, the current column number, CurColNum, is incremented by one, and the process continues to step 348 of FIG. 16A.

In step 376 of FIG. 16B, if the current column is not varying-length, step 392 sets the value of the adjustment of the Comparison Table, CTab.Adjust(Row) equal to FixedAccumP. The process continues to step 394 of FIG. 16C.

In step 394, if all varying-length columns have been processed, that is, if the value of VarProcessed is equal to the value of TotalVarNum, step 396 sets the value of FixedAccumP equal to zero, and the process continues to step 388. If, in step 394, not all varying-length columns have been processed, the process continues to step 388.

The following exemplary pseudo-code builds a Comparison Table 82 and may be implemented in the Build Comparison Table procedure of FIG. 1.

```
-----------------------------------------------------------------------------------
Table Columns
-----------------------------------------------------------------------------------
Row            = Row number in table
BeginCol       = Beginning column of a comparison group
EndCol         = Ending column of a comparison group
Offset1        = Key offset index 1
Offset2        = Key offset index 2
Adjust         = Key adjustment value for fixed-length fields and offset
                 array length used to determine the length of a group
PadChar        = Padding character
Local Variables
-----------------------------------------------------------------------------------
AdjustVal       = Adjustment Value
BeginCompRange  = Beginning comparison range
CurColNum       = Current column number
FixedAccumF     = Accumulation of the lengths of fixed columns
                  following the last varying-length column
FixedAccumP     = Accumulation of the lengths of fixed columns
                  preceding a varying-length column
NumRows         = Number of rows in Comparison Table
OffsetLength    = Length of offset array element
Offset1         = Offset index #1
Offset2         = Offset index #2
TotalColNum     = Total number of columns in key
TotalVarNum     = Total number of varying-length columns in key
VarProcessed    = Number of varying-length columns processed
Local Flags
-----------------------------------------------------------------------------------
CreateRow       = Yes, if a row will be created for the table
OneColumn       = Yes, if comparing only one column in a group
NumRows = 0
Do I = 1 to TotalColNum                 - Identifies groups of columns
    If column(I) is a varying-length column OR the last column Then
        NumRows = NumRows + 1
End
```

Determine the size of the Comparison Table based on NumRows

Allocate and clear storage for the Comparison Table, CTab

Initialize variables:
Offset1=0
Offser2=TotalVarNum
AdjstVal=Offset1*OffsetLength
FixedAccumP=0
FixedAccumF=0
BeginCompRange=1
Row=1
CeateRow=No

```
Do CurColNum = 1 to TotalColNum
    If the datatype of the CurColNum is a varying-length column
    Then Do
        CreateRow = Yes
        VarProcessed = VarProcessed + 1
        If CurColNum = last varying-length column AND fixed
        columns follow
            Then Do
                Loop through the fixed-length columns following the
                last varying-
                    length column to sum the lengths of those fixed-
                    length columns
                Set FixedAccumF = Sum of the lengths of the fixed-
                length
                    columns following the last varying-length column
            End
        End
    Else Do
        FixedAccumP =FixedAccumP+length of column specified by
        CurColNum
```

```
        If CurColNum specifies the last column Then
            CreateRow = Yes
    End
    If CreateRow Then Do
        CTab.BeginCol(Row) = BeginCompRange
        CTab.EndCol(Row) = CurColNum
        BeginCompRange = CurColNum + 1
        If CTab.BeginCol(Row) = CTab.EndCol(Row) Then
            OneColumn = Yes
        If CurColNum specifies a varying-length column Then Do
            CTab.Offset1(Row) = Offset1
            CTab.Offset2(Row) = Offset2
            If OneColumn Then
                CTab.Adjust(Row) = -(AdjustVal +
                    FixedAccumF +
                                 FixedAccumP)
            Else
                CTab.Adjust(Row) = - (AdjustVal +
                    FixedAccumF)
            Offset2 = Offset1
            Offset1 = Offset1 - 1
            AdjustVal = 0
            FixedAccumP = 0
        End
        Else Do              - Fixed Column
            CTab.Adjust(Row) = FixedAccumP
            If VarProcessed = TotalVarNum Then
                FixedAccumP = 0
        End
        Set PadChar for Row based on datatype of current column as
        specified by
            CurColNum
        CreateRow = No
        OneColumn = No
        Row = Row + 1
    End
End
```

Figure 17A:
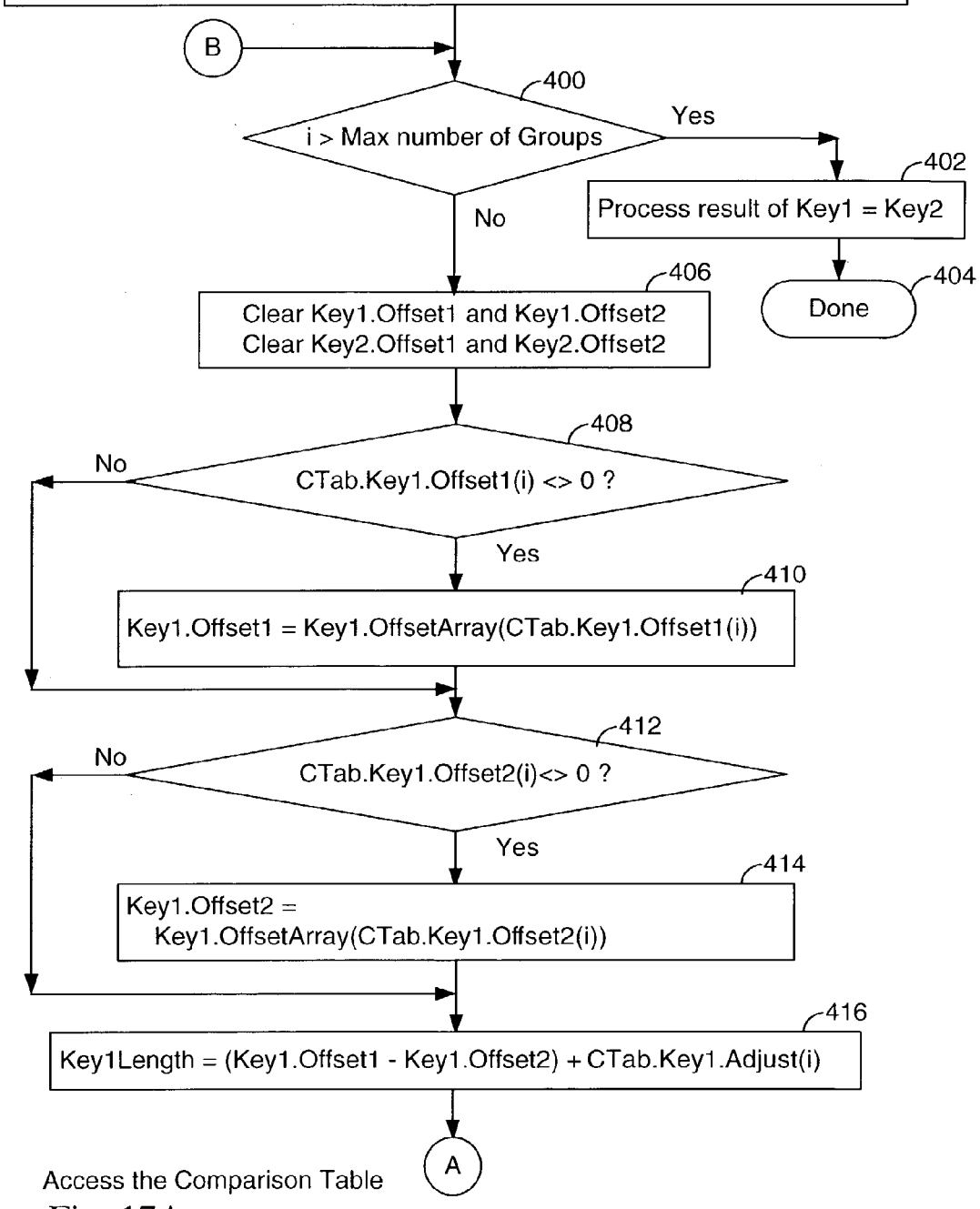
FIGS. 17A and 17B collectively depict a flowchart of a process that accesses the Comparison Table of FIG. 13, which is executed in the computer of FIG. 1.
Figure 17B:
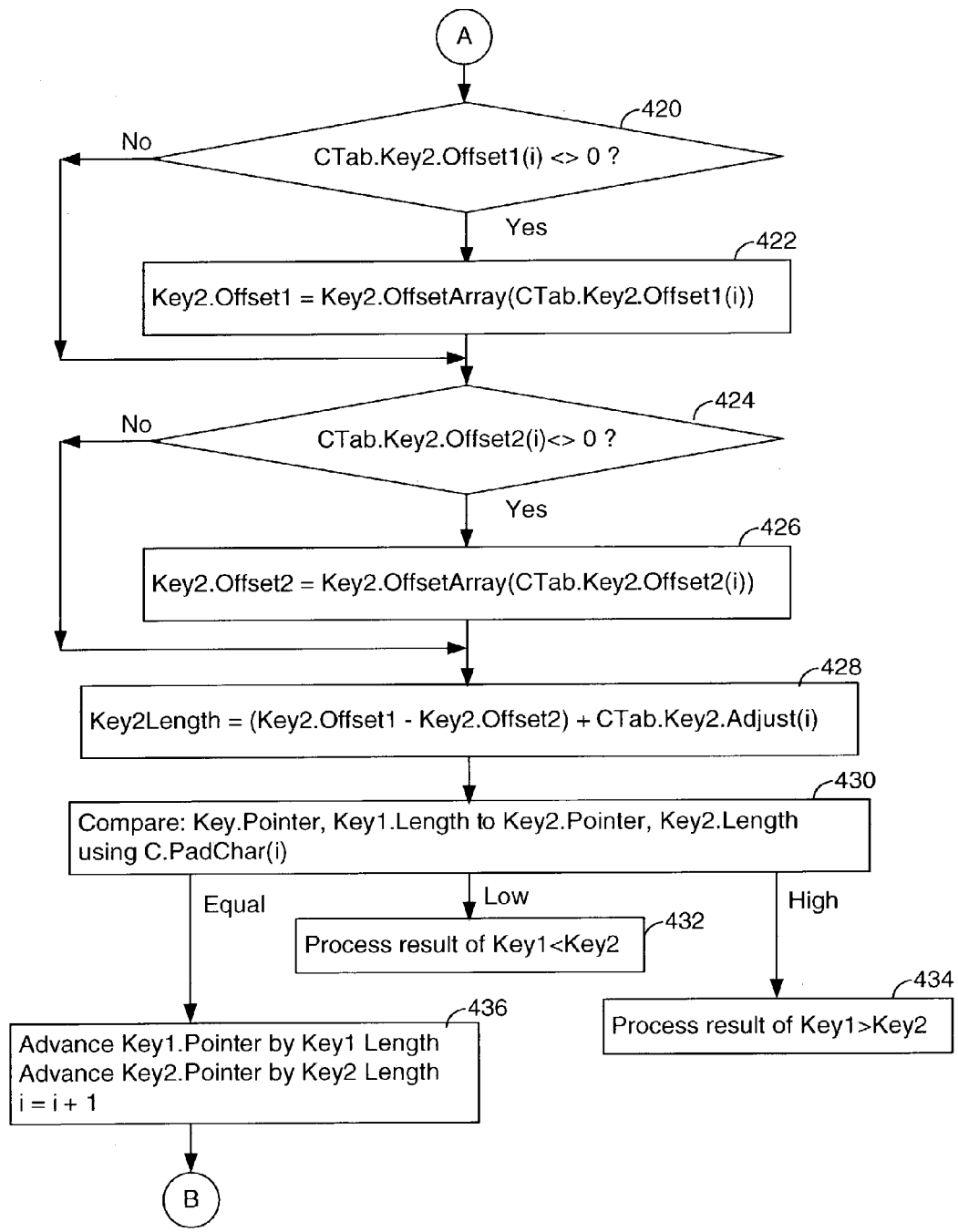

FIGS. 17A and 17B collectively depict a flowchart of a process that accesses the Comparison Table of FIG. 13 to compare two entries. In one embodiment, the columns of the entries being compared comprise keys. Alternately, the columns of the entries being compared comprise columns of a database table. In one embodiment, the Access Comparison Table procedure 84 of FIG. 1 implements the flowchart of FIGS. 17A and 11B, and is executed by the computer 30 of FIG. 1. In another embodiment, the Access Comparison Table procedure 84 is invoked when the set of entries is accessed, for example, during to a Select Procedure or Insert Procedure. Although the flowchart of FIGS. 17A and 17B compares keys, in yet another embodiment, data rows, or alternately portions of data rows, are compared rather than keys.

In step 398, the entries, referred to as Key 1 and Key 2, are received; the length of the offset array is determined; and, variables are initialized. In an alternate embodiment, one of the keys, Key 1 or Key 2, is not an entry from a set of entries but is derived from search criteria. Key1.OffsetPointer is set equal to the address of Key 1. Key1.Pointer is set to the address of the first column of Key 1. Key2.OffsetPointer is set equal to the address of Key 2. Key2.Pointer is set equal to the address of the first column of Key 2. A group counter i is set equal to one.

Step 400 determines whether the group counter i is greater than the maximum number of groups. If so, step 402 processes the result for Key 1 being equal to Key 2, and process ends (step 404).

If, in step 400, the group counter i is not greater than the maximum number of groups, step 406 clears Key 1.Offset 1, Key 1.Offset2, Key2.Offset 1 and Key2.Offset2. Step 408 determines, for Key 1, whether offset 1 for the $i^{th}$ group of the Comparison Table, CTab.Key1.Offset1(i) is not equal to zero. If so, step 410 sets Key1.Offset1 equal to Key1.OffsetArray(CTab.Key1.Offset1(i)), and proceeds to step 412. If step 408 determines that offset 1 of the Comparison Table is equal to zero, the process continues to step 412.

Step 412 determines, for Key 1, whether offset 2 for the $i^{th}$ group of the Comparison Table, CTab.Key1.Offset2(i) is not equal to zero. If so, step 414 sets Key1.Offset2 equal to Key1.OffsetArray(CTab.Key1.Offset2(i)), and proceeds to step 416. If step 412 determines that offset 2 of the Comparison Table is equal zero, the process continues to step 416.

Step 416 determines the length of the $i^{th}$ group for Key 1. Key1Length is set equal to (Key1.Offset1−Key1.Offset2)+ CTab.Key1.Adjust(i), and the process continues to step 420 of FIG. 17B.

Step 420 determines, for Key 2, whether offset 1 for the $i^{th}$ group of the Comparison Table, CTab.Key2.Offset1(i) is not equal to zero. If so, step 422 sets Key2.Offset1 equal to Key2.OffsetArray(CTab.Key2.Offset1(i)), and proceeds to step 424. If step 420 determines that offset 1 for the $i^{th}$ group of the Comparison Table is equal zero, the process continues to step 424.

Step 424 determines, for Key 2, whether offset 2 for the $i^{th}$ group of the Comparison Table, CTab.Key2.Offset2(i) is not equal to zero. If so, step 426 sets Key2.Offset2 equal to Key2.OffsetArray(CTab.Key1.Offset2(i)), and proceeds to step 428. If step 424 determines that offset 2 for the $i^{th}$ group of the Comparison Table is equal zero, the process continues to step 428.

Step 428 determines the length of the $i^{th}$ group for Key 2. Key2Length is set equal to (Key2.Offset1−Key2.Offset2)+ CTab.Key2.Adjust(i).

In step 430, the $i^{th}$ groups of Key 1 and Key 2 are logically compared based on Key.Pointer, Key1.Length, Key2.Pointer, Key2.Length using the padding value (CTab.PadChar(i)) from the Comparison Table to pad the shorter group.

If the result of the compare in step 430 is low, Key 1 is less than Key 2, the comparison ends and further processing continues in step 432.

If the result of the compare in step 430 is high, Key 1 is greater than Key 2, the comparison ends, and further processing continues in step 434.

If the result of the compare in step 430 is equal, in step 436, Key1.Pointer is advanced by the length of Key 1, Key2.Pointer is advanced by the length of Key 2, the group counter i is incremented by one, and the process continues to step 402 of FIG. 17A to continue comparing groups.

Exemplary pseudo-code to compare two keys, Key 1 and Key 2, with varying-length columns is shown below. In this example, the Comparison Table for Key1 and Key2 is that shown in FIG. 13. In an alternate embodiment, Key1 and Key2 may have different Comparison Tables, therefore in the code below, the Comparison Table for key 1 is referenced as CTab.Key1 and the Comparison Table for key 2 is referenced as CTab.Key2.

---

```
OffsetArrayLength = Number of Offset Elements * Length of each
offset element
Key1.OffsetPointer = Input_Key1_Address
Key1.Pointer = Input_Key1_Address + OffsetArrayLength
Key2.OffsetPointer = Input_Key2_Address
Key2.Pointer = Input_Key2_Address + OffsetArrayLength
For GroupNum = 1 to Max number of Comparison Table rows
    Clear Key1.Offset1 and Key1.Offset2
    Clear Key2.Offset1 and Key2.Offset2
    If CTab.Key1.Offset1(GroupNum) < > 0 Then
```

-continued

```
        Key1.Offset1 = Key1.OffsetArray(CTab.Key1.Offset1
            (GroupNum))
    If CTab.Key1.Offset2(GroupNum) < > 0 Then
        Key1.Offset2 = Key1.OffsetArray(CTab.Key2.Offset2
            (GroupNum))
    Key1Length = (Key1.Offset1 − Key1.Offset2) +
            CTab.Key1.Adjust(GroupNum)
    If CTab.Key2.Offset1(GroupNum) < > 0 Then
        Key2.Offset1 = Key2.OffsetArray(CTab.Key2.Offset1
            (GroupNum))
    If CTab.Key2.Offset2(GroupNum) < > 0 Then
        Key2.Offset2 = Key2.OffsetArray(CTab.Key2.Offset2
            (GroupNum))
    Key2Length = (Key2.Offset1 − Key2.Offset2) +
            CTab.Key2.Adjust(GroupNum)
    Compare: Key1.Pointer, Key1.Length, to Key2.Pointer, Key2.Length
    using
        CTab.PadChar(GroupNum)
    Branch on high to High Label to process the result of Key1 > Key2
    Branch on low to Low Label to process the result of Key1 < Key2
    Fall through for equal
    Advance pointers to compare the next group:
    Advance Key1.Pointer by Key1.Length
    Advance Key2.Pointer by Key2.Length
End
Equal Label: Process the result for Key1 = Key2
High Label: Process the result for Key1 > Key2
Low Label: Process the result for Key1 < Key2
```

---

Although the pseudo-code above compares keys, in an alternate embodiment, data rows, or portions of data rows are compared, rather than keys.

Figure 18A:
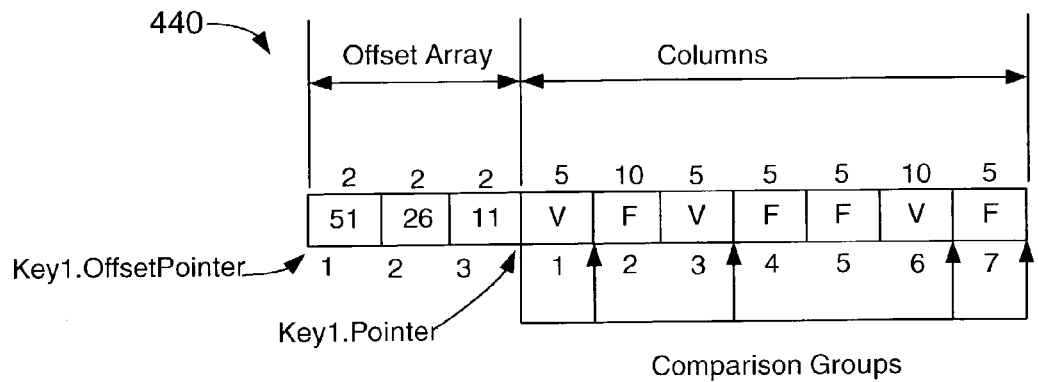
FIGS. 18A and 18B depict exemplary first and second keys, Key 1 and Key 2, which are stored in an index in the memory of FIG. 1, which are used to demonstrate the comparison technique of FIGS. 17A and 17B.
Figure 18B:
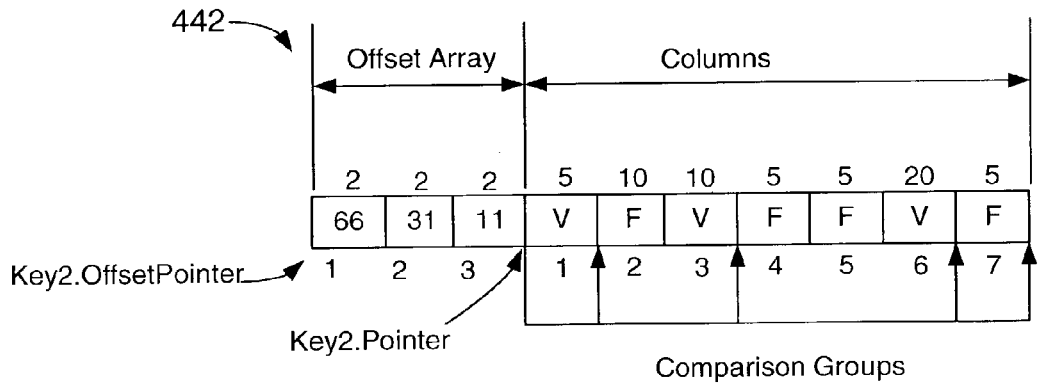

FIGS. 18A and 18B depict the comparison of two exemplary keys, Key 1 440 and Key 2 442. FIGS. 18A and 18B also depict the initial locations referenced by Key1.OffsetPointer, Key1.Pointer, Key2.OffsetPointer and Key2.Pointer in the pseudo-code above.

In the following example, two comparison groups are compared and an inequality will result after the second comparison. If the comparison procedure determined that Key 1 and Key 2 were equal, all four comparison groups in the Comparison Table would be compared.

Comparison Group 1:

GroupNum=1

Determine Key1Length $$Key1.Offset1 = Key1.OffsetArray(CTab.Key1.Offset1(GroupNum))$$

$$= Key1.OffsetArray(3)$$

$$= 11$$

$$Key1.Offset2 = 0$$

$$Key1Length = (11 - 0) + CTab.Key1.Adjust(GroupNum)$$

$$= 11 + (-6)$$

$$= 5$$

Determine Key2Length $$Key2.Offset1 = Key2.OffsetArray(CTab.Key2.Offset1(GroupNum))$$

$$= Key2.OffsetArray(3)$$

$$= 11$$

-continued $$Key2.\textit{Offset2} = 0$$

$$Key2Length = (11 - 0) + CTab.Key2.Adjust(GroupNum))$$

$$= 11 + (-6)$$

$$= 5$$

Compare Key1.Pointer, Key1Length, to Key2.Pointer, Key2.Length.

In this example, the length of comparison group one for Key 1 and Key 2 is the same and no padding is needed. The result of the above comparison is assumed to be equal. Therefore the second comparison group will be compared. The group counter, GroupNum, is incremented by one, and is now equal to two. Key1.Pointer and Key2.Pointer are both incremented by their respective Key Lengths, that is, Key1Length and Key2Length, to point to comparison group two.

Comparison Group 2:

GroupNum=2

Determine Key1Length $$Key1.\textit{Offset1} = Key1.\textit{OffsetArray}(CTab.Key1.\textit{Offset1}(2))$$

$$= Key1.\textit{OffsetArray}(2)$$

$$= 26$$

$$Key1.\textit{Offset2} = Key1.\textit{OffsetArray}(CTab.Key1.\textit{Offset2}(2))$$

$$= Key1.\textit{OffsetArray}(3)$$

$$= 11$$

$$Key1Length = (26 - 11) + CTab.Key1.Adjust(2)$$

$$= 15 + 0$$

$$= 15$$

Determine Key2Length $$Key2.\textit{Offset1} = Key2.\textit{OffsetArray}(CTab.Key2.\textit{Offset1}(2))$$

$$= Key2.\textit{OffsetArray}(2)$$

$$= 31$$

$$Key2.\textit{Offset2} = Key2.\textit{OffsetArray}(CTab.Key2.\textit{Offset2}(2))$$

$$= Key2.\textit{OffsetArray}(3)$$

$$= 11$$

$$Key2Length = (31 - 11) + CTab.Key2.Adjust(2))$$

$$= 20 + 0$$

$$= 20$$

For Comparison Group 2, because Key1Length is less than Key2Length, Key 1 will be logically compared with Key 2 using PadChar. For those positions in which Key 1 does not have an equivalent character to compare to Key 2, the comparison will be performed using PadChar for that character of Key 1. Because this example assumes that comparison group two for Key 1 is not equal to comparison group two for Key 2, the process ends.

Additional Embodiments

Figure 19:
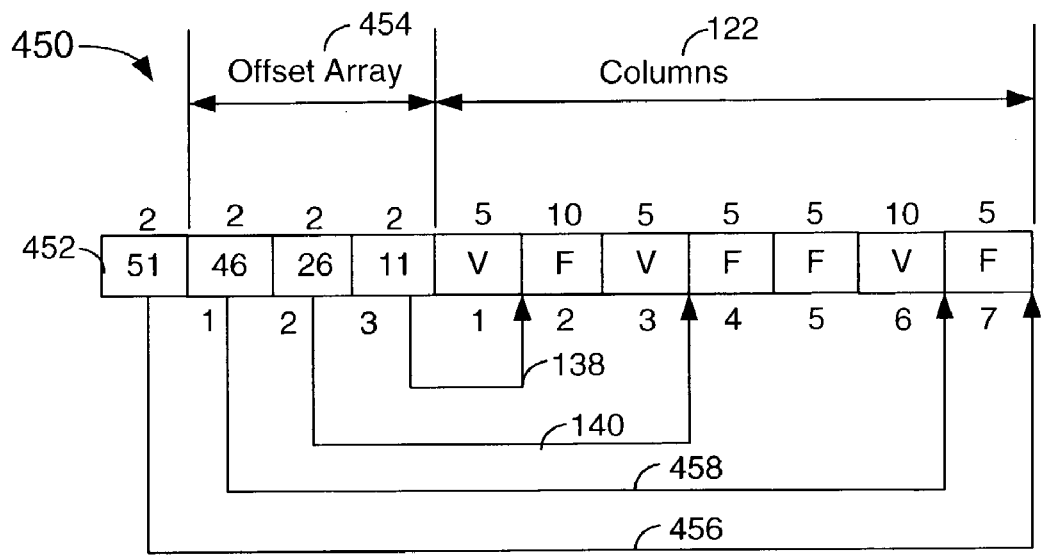
FIG. 19 depicts an exemplary entry 450 using an alternate embodiment of the entry format.

Referring to FIG. 19, an exemplary entry 450 using an alternate embodiment of the entry format is shown. The columns 122 of entry 450 are the same as the columns 122 of FIG. 5. In the embodiment of FIG. 19, a separate total-entry-length field 452, which precedes the offset array 454, stores a value representing the total length of the entry, as shown by arrow 456, rather than storing the total length of the entry in the first offset. Each offset of the offset array 454 has a value that points to the last byte of a respective varying-length column, as shown by arrows 138, 140 and 458.

To generate the entry, in FIG. 6, step 166 is modified such that a total-entry-length variable is set equal to bytecount, rather than OffsetArray(1). Step 168 would also include setting the value of the total-entry-length field of the entry to equal bytecount.

To generate the Column Extraction Table, step 222 of FIG. 10A is modified to determine BeginAdjust as follows:

BeginAdjust=OffsetLength*TotalVarNum+length of the total-entry-length field.

In this embodiment, the Length Adjustment of the Column Extraction Table is not modified to accommodate for any fixed-length columns following the last varying-length column; therefore, steps 248 and 252 are not performed.

Figure 20:
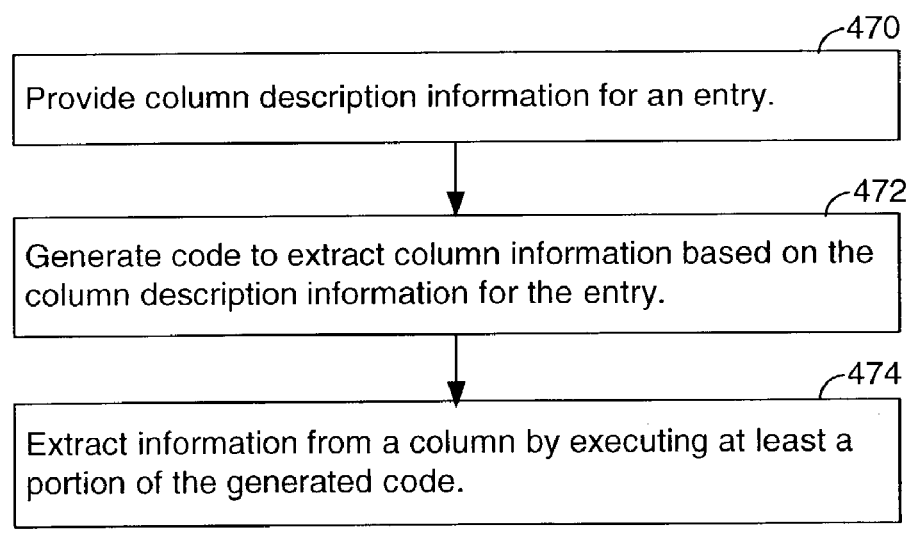
FIG. 20 depicts a high-level flowchart of a process of building and using extraction code in accordance with an alternate embodiment of the invention, which is executed in the computer of FIG. 1.

Referring to FIG. 20, in yet another embodiment, the function of the Column Extraction Table is performed by code. In step 470, the column description information for an entry is provided. In step 472, code is generated to extract column information based on the column description information for the entry. The generated code comprises one or more instructions to determine the position of the columns of the entry based on the offset array. The code also has instructions to determine the length of a varying-length column based on at least one offset of the offset array. In one embodiment, step 472 invokes the Generate Extraction Code Procedure 85 (FIG. 1). In another embodiment, the Generate Extraction Code Procedure 85 generates at least a portion of the instructions of the Extract Column Info Procedure 80 of FIG. 1. In another alternate embodiment, the Generate Extraction Code Procedure 85 is invoked instead of the Build Column Extraction Table Procedure 78.

In step 474, information is extracted or accessed by executing at least a portion of the generated code. More particularly, at least a portion of the generated code is executed to access information stored in a specified column of a specified entry.

In this embodiment, each column is associated with a subset of the generated code. For example, for the entry of FIG. 5, the subset of the generated code to determine the column offset or starting position of column six performs the following operation:

ColumnOffset=OffsetArray(2)+10.

To determine the length of column six, the subset of the generated code performs the following operation:

ColumnLength=OffsetArray(1)−OffsetArray(2)−15.

Depending on the particular column of the entry, the generated code comprises references to the offset array, if any for that column, to determine the column offset and/or column length for that column. Exemplary generated code to determine the column offset (ColumnOffset) and column length (ColumnLength) for the entry of FIG. 5 is shown below.

```
If ColNum = 1 Then
    ColumnOffset=6
    ColumnLength=OffsetArray(3)-6.
If ColNum = 2 Then
    ColumnOffset=OffsetArray(3)
    ColumnLength= 10
If ColNum = 3 Then
    ColumnOffset=Offset Array(3)+10
    ColumnLength=OffsetArray(2)-OffsetArray(3)-10
If ColNum = 4 Then
    ColumnOffset=OffsetArray(2)
    ColumnLength=5
If ColNum = 5 Then
    ColumnOffset=OffsetArray(2)+5
    ColumnLength=5
If ColNum = 6 Then
    ColumnOffset=OffsetArray(2)+10.
    ColumnLength=Offset Array(1)-OffsetArray(2)-15.
If ColNum = 7 Then
    ColumnOffset=OffsetArray(1)-5
    ColumnLength=5
```

Figure 21A:
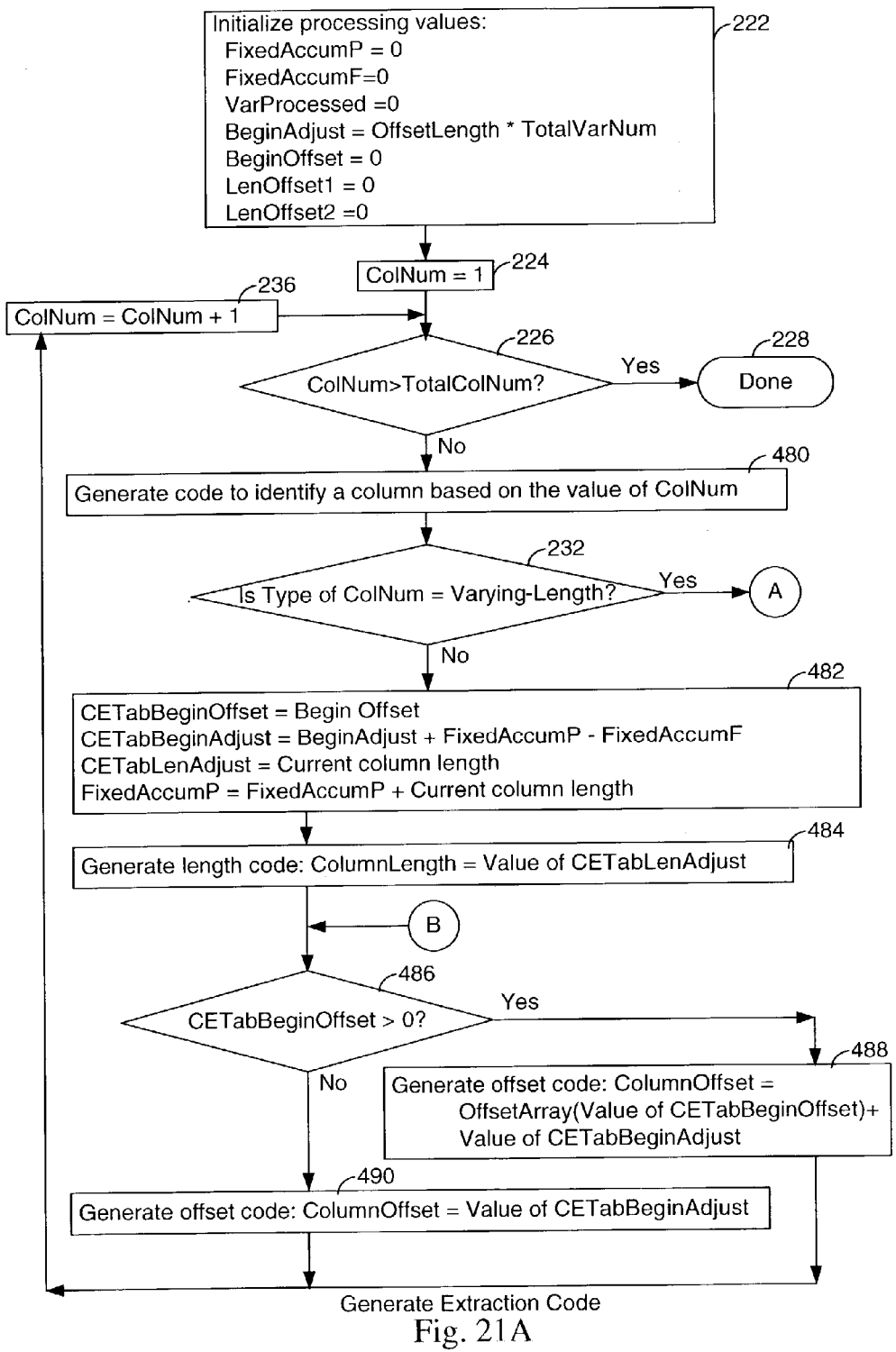
FIGS. 21A, 21B and 21C collectively depict a flowchart of a process that generates extraction code in accordance with an alternate embodiment of the invention, which is executed in the computer of FIG. 1.
Figure 21B:
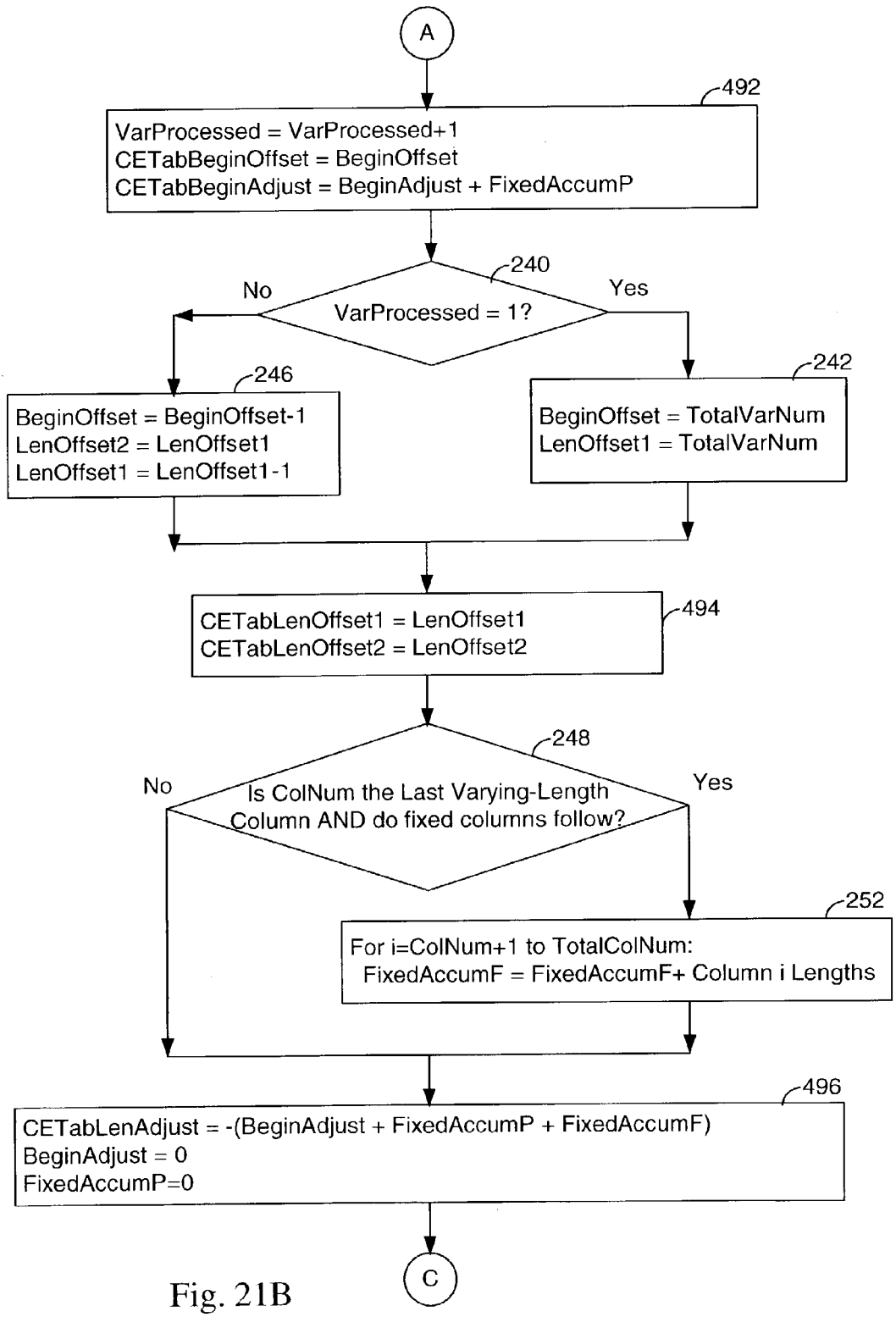
Figure 21C:
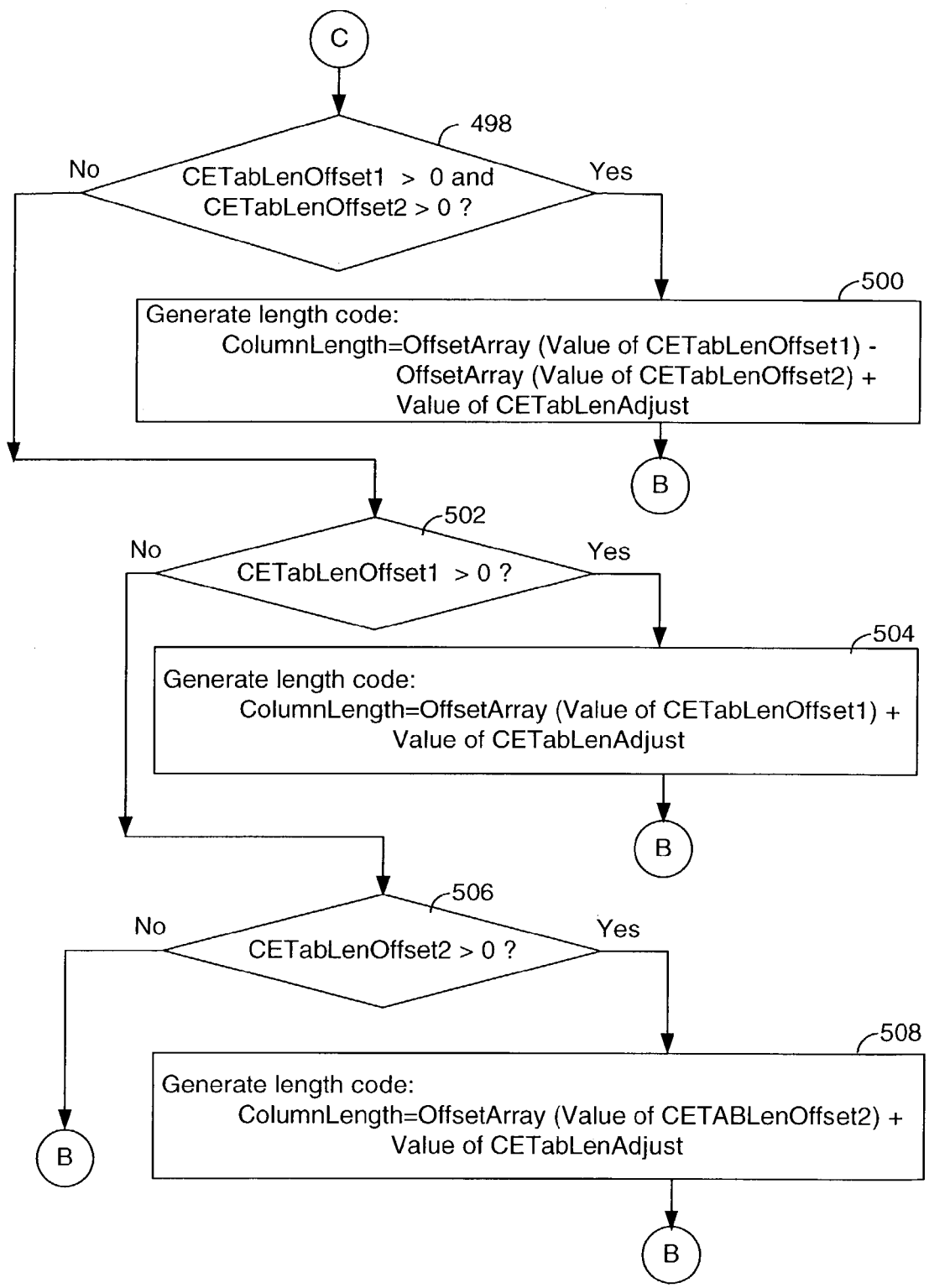

FIGS. 21A, 21B and 21C collectively depict a flowchart of a process to generate the extraction code of step 472 of FIG. 20. FIGS. 21A and 21B are similar to FIGS. 10A and 10B, respectively, therefore the differences will be described. Steps 222 through 228 of FIG. 21A are the same as in FIG. 10A and will not be further described.

In FIG. 21A, after step 226, step 480 generates code to identify a column based on the value of ColNum. This code precedes the code that determines the column length and offset for the column specified by ColNum. Code is generated and output to, or alternately inserted into, a file to determine whether a variable, ColNum, is equal to a specified value. A string of characters (enclosed by quotation marks) is output. The string is "If ColNum=". Next, the value of ColNum is output, followed by another string containing the word "Then". For example, in step 520, if ColNum has a value of one, the following code will be output: If ColNum=1 Then.

Step 232 then determines whether the Type of Column specified by ColNum is varying-length. If not, the column specified by ColNum is a fixed-length column; and, in step 482, the variables CETabBeginOffset, CETabBeginAdjust and CETabLenAdjust are used to temporarily store values of the Begin Offset, Begin Adjust, and Length Adjustment, respectively. In step 482, the value of CETabBeginAdjust is equal to sum of the values of BeginAdjust and FixedAccumP minus the value of FixedAccumF. The variable, FixedAccumP, is incremented by the length of the current column, as specified by ColNum. In step 484, code is generated to determine the length the column as follows: ColumnLength=Value of CETabLenAdjust. In other words, a string, "ColumnLength=", is output, and is followed by the value of CETabLenAdjust. For example, if the value of CETabLenAdjust is six, the generated code is as follows: ColumnLength=6.

Step 486 determines whether the value of CETabBeginOffset is greater than zero. If so, step 488 generates code to determine the column offset as follows: ColumnOffset=OffsetArray(Value of CETabBeginOffset)+ Value of CETabBeginAdjust. In other words, a string, "ColumnOffset=OffsetArray(" is output, followed by the value of CETabBeginOffset. Another string, ")+", is then output followed by the value of CETabBeginAdjust. For example, if the value of CETabBeginOffset is equal to three and the value of CETabBeginAdjust is equal to six, the generated code is as follows: ColumnOffset=OffsetArray (3)+6. The process then continues to step 236, which increments the column counter, ColNum, by one to reference the next column.

If, in step 486, the value of CETabBeginOffset is not greater than zero, step 490 generates code to determine the column offset as follows: ColumnOffset=Value of CETabBeginAdjust. The process continues to step 236.

If, in step 232, the type of column specified by ColNum, is varying-length, the process continues to step 492 of FIG. 21B. Step 492 of FIG. 21B is similar to step 238 of FIG. 10B, except that the variable CETabBeginOffset stores the value of BeginOffset, and the variable CETabBeginAdjust stores the value of the sum of BeginAdjust and FixedAccumP. Steps 240, 242 and 244 of FIG. 21B are the same as in FIG. 10B and will not be further described. Step 494 of FIG. 21B is similar to step 244 of FIG. 10B, except that the variables CETabLenOffset1 and CETabLenOffset2 store the values of LenOffset1 and LenOffset2, respectively. Steps 248 and 250 of FIG. 21B are the same as in FIG. 10B and will not be further described. Step 496 of FIG. 21B is similar to step 250 of FIG. 10B except that a variable CETabLenAdjust stores the value of the length adjustment, and the process continues to step 498 of FIG. 21C.

FIG. 21C generates code to determine the length of a varying-length column based on the values of CETabLenOffset1, CETabLenOffset2 and CETabLenAdjust. Step 498 determines whether the values of both CETabLenOffset1 and CETabLenOffset2 are greater than zero. If so, step 500 generates code to determine the length of a column as follows: ColumnLength=OffsetArray(Value of CETabLenOffset1)–OffsetArray(Value of CETabLenOffset2)+Value of CETabLenAdjust. The process then continues to step 486 of FIG. 21A to generate code to determine the column offset.

If, in step 498, values of both CETabLenOffset1 and CETabLenOffset2 are not greater than zero, step 502 determines whether the value of CETabLenOffset1 is greater than zero. If so, step 504 generates code to determine the length of a column as follows: ColumnLength=OffsetArray(Value of CETabLenOffset1)+Value of CETabLenAdjust. The process then continues to step 486 of FIG. 21A.

If, in step 502, the value of CETabLenOffset1 is not greater than zero, step 506 determines whether the value of CETabLenOffset2 is greater than zero. If so, step 508 generates code to determine the length of a column as follows: ColumnLength=OffsetArray(Value of CETabLenOffset2)+Value of CETabLenAdjust. The process then continues to step 486 of FIG. 21A. If, in step 506, the value of CETabLenOffset2 is not greater than zero, the process continues to step 486 of FIG. 21A.

The invention has been described by way of a specific embodiments, but those skilled in the art will understand that various changes in form and detail may be made without deviating from the spirit or scope of the invention.

What is claimed is:

1. A computer-implemented method of operating a database comprising:
    providing a set of entries comprising at least one entry, the at least one entry comprising columns, one or more of the columns being varying length columns and zero or more of the columns being fixed length columns, the at least one entry comprising an offset array having one or more offsets associated with the one or more varying length columns, respectively, the offset associated with a last varying length column having an offset-value of an ending position of the entry, other offsets having offset-values of ending positions of the associated varying length columns, respectively;

building a column-extraction-table comprising at least one offset-array-number specifying the offset that is associated with a predecessor varying length column, if any, preceding at least one of the columns; and accessing information in a particular column of a particular entry of the set of entries based on a starting position of the particular column, the particular entry having a particular offset array, the starting position being based on the offset-value of the offset of the particular offset array that is associated with the predecessor varying length column, if any, preceding said particular column, the offset of the particular offset array being specified by the offset-array-number that is associated with the particular column in the column-extraction-table, and a length of any fixed length columns between the predecessor varying length column and the particular column.

2. The method of claim 1 wherein if the particular column is a fixed length column following the last varying length column, the starting position is based on the offset-value of the offset, of the particular offset array, that is associated with the last varying length column, and a length of the particular column and a length of any fixed length columns between the particular column and the ending position of the entry.

3. The method of claim 1, wherein said building also builds the column-extraction-table comprising, for each column of the at least one entry, a begin-offset and a begin-adjustment, wherein the begin-offset has a value of the offset-array-number specifying the offset of the offset array associated with the predecessor varying length column, if any, preceding said each column, wherein the begin-adjustment has a value comprising the length of one or more of the fixed length columns, if any, between the predecessor varying length column and said each column if said each column is not a fixed length column following the last varying length column; wherein if said each column is a fixed length column following the last varying length column, the begin-adjustment having a value comprising the length of said each column and any fixed length columns between said each column and an ending position of the entry; and wherein the starting position is based on the offset-value of the offset of the particular offset array that is specified by the offset-array-number of the begin-offset that is associated with the particular column in the column-extraction-table, and the length of any fixed length columns between the predecessor varying length column and the particular column that is specified by the begin-adjustment that is associated with the particular column in the column-extraction-table.

4. The method of claim 1 further comprising:

determining a length of the particular column based on the offset-value of the offset associated with the predecessor varying length column, the offset-value of the offset associated with the particular column, and the length of any fixed length columns between the predecessor varying length column and the particular column;

wherein said accessing information in the particular column is also based on the length of the particular column.

5. The method of claim 1 wherein said building also builds the column-extraction-table comprising, for each column of the at least one entry, at least one offset-array-number specifying at least one offset of the offset array, respectively, associated with said each column of the at least one entry;

wherein the starting position and a length of the particular column are based on at least one offset-value of at least one offset of the particular offset array that is specified by the at least one offset-array-number associated with the particular column in the column-extraction-table.

6. The method of claim 5 wherein the at least one offset-array-number comprises a first offset-array number, a second offset-array-number and a third offset-array-number, the starting position of the particular column being based on the first offset-array-number, and the length of the particular column being based on at least one of the offset-value of the offset specified by the second offset-array-number and the offset-value of the offset specified by the third offset-array-number, wherein the particular column is also accessed based on the length of the particular column.

7. The method of claim 1 further comprising:

generating one or more instructions to perform said accessing.

8. The method of claim 2 further comprising:

executing at least a subset of said one or more instructions.

9. The method of claim 1, further comprising:

building at least one comparison-table for the at least one entry and another entry, the at least one comparison-table comprising at least one offset-array-number; and comparing the particular entry with another particular entry based on the at least one offset-array-number of the at least one comparison-table and the offset arrays of the entries.

10. The method of claim 1 further comprising:

building a comparison-table defining groups comprising one or more adjacent columns of the at least one entry and another comparison-table defining groups comprising one or more adjacent columns of another entry of another set of entries, such that a last group has up to one of the varying length columns, and each of the other groups comprise one varying length column, and the one varying length column is a last column of said each of the other groups; and comparing the particular entry with another particular entry based on one or more of the groups of the comparison-table and the another comparison-table.

11. The method of claim 1 further comprising:

building a comparison-table to define groups of one or more columns of the set of entries, the comparison-table comprising at least one offset-array-number specifying at least one offset, respectively, of the offset array, and another comparison-table to define groups of one or more columns of another set of entries, the another comparison-table comprising at least one offset-array-number specifying at least one offset of an offset array of the another set of entries;

determining a length of one group of the groups of the particular entry based on the comparison-table and the offset-values of the offsets of the offset array of the particular entry specified by the at least one offset-array-number of the comparison-table, and a length of one group of the groups of another particular entry of the another set of entries based on the another comparison-table and the offset-values of the offsets of the offset arrays of the another particular entry specified by the at least one offset-array-number of the another comparison-table; and comparing the one group of the particular entry and the one group of the another particular entry using a padding character if the length of the one group of the particular entry is different from the length of the one group of the another particular entry.

12. An apparatus for operating a database management system, comprising:

a computer having a data storage device connected thereto, wherein the data storage device stores a database comprising at least one set of entries;

one or more computer programs, executed by the computer, for:

providing a set of entries comprising at least one entry, the at least one entry comprising columns, one or more of the columns being varying length columns and zero or more of the columns being fixed length columns, the at least one entry comprising an offset array having one or more offsets associated with the one or more varying length columns, respectively, the offset associated with a last varying length column having an offset-value of an ending position of the entry, other offsets having offset-values of ending positions of the associated varying length columns, respectively;

accessing information in a particular column of a particular entry of the set of entries based on a starting position of the particular column, the particular entry having a particular offset array, the starting position being based on the offset-value of the offset of the particular offset array that is associated with a predecessor varying length column, if any, preceding said particular column, and a length of any fixed length columns between the predecessor varying length column and the particular column;

building at least one comparison-table for the at least one entry and another entry, the at least one comparison-table comprising at least one offset-array-number; and comparing the particular entry with another particular entry based on the at least one offset-array-number of the at least one comparison-table.

13. The apparatus of claim 12, wherein if the particular column is a fixed length column following the last varying length column, the starting position is based on the offset-value of the offset, of the particular offset array, that is associated with the last varying length column, and a length of the particular column and a length of any fixed length columns between the particular column and the ending position of the entry.

14. The apparatus of claim 12, wherein said one or more computer programs are also for:

building a column-extraction-table comprising, for each column of the at least one entry, a begin-offset and a begin-adjustment, wherein the begin-offset has a value of an offset-array-number specifying the offset of the offset array associated with the predecessor varying length column, if any, preceding said each column, wherein the begin-adjustment has a value comprising the length of the fixed length columns, if any, between the predecessor varying length column and said each column if said each column is not a fixed length column following the last varying length column; wherein if said each column is a fixed length column following the last varying length column, the begin-adjustment having a value comprising the length of said each column and any fixed length columns between said each column and an ending position of the entry; and wherein the starting position is based on the offset-value of the offset of the particular offset array that is associated with the predecessor varying length column, if any, preceding the particular column that is specified by the begin-offset, and the length of any fixed length columns between the predecessor varying length column and the particular column that is specified by the begin-adjustment.

15. The apparatus of claim 12, wherein the one or more computer programs also generate one or more instructions to perform said accessing.

16. The apparatus of claim 12, wherein the one or more computer programs are also for:

determining a length of the particular column based on the offset-value of the offset associated with the predecessor varying length column, the offset-value of the offset associated with the particular column, and a length of any fixed length columns between the predecessor varying length column and the particular column;

wherein said accessing information in the particular column is also based on the length of the particular column.

17. An article of manufacture comprising a computer usable medium having computer usable program code for operating a database management system, said article of manufacture including:

computer usable program code for providing a set of entries comprising at least one entry, the at least one entry comprising columns, one or more of the columns being varying length columns and zero or more of the columns being fixed length columns, the at least one entry comprising an offset array having one or more offsets associated with the one or more varying length columns, respectively, the offset associated with a last varying length column having an offset-value of an ending position of the entry, other offsets having offset-values of ending positions of the associated varying length columns, respectively;

computer usable program code for building a column-extraction-table comprising at least one offset-array-number specifying the offset that is associated with a predecessor varying length column, if any, preceding at least one of the columns; and computer usable program code for accessing information in a particular column of a particular entry of the set of entries based on a starting position of the particular column, the particular entry having a particular offset array, the starting position being based on the offset-value of the offset of the particular offset array that is associated with the predecessor varying length column, if any, preceding said particular column, the offset of the particular offset array being specified by the offset-array-number that is associated with the particular column in the column-extraction-table, and a length of any fixed length columns between the predecessor varying length column and the particular column.

18. The article of manufacture of claim 17 wherein if the particular column is a fixed length column following the last varying length column, the starting position being based on the offset-value of the offset, of the particular offset array, that is associated with the last varying length column, and a length of the particular column and a length of any fixed length columns between the particular column and the ending position of the entry.

19. The article of manufacture of claim 17 wherein said computer usable program code for building also builds the column-extraction-table comprising, for each column of the at least one entry, a begin-offset and a begin-adjustment, wherein the begin-offset has a value of the offset-array-number specifying the offset of the offset array associated with the predecessor varying length column, if any, preceding said each column, wherein the begin-adjustment has a value comprising the length of the fixed length columns, if any, between the predecessor varying length column and said each column if said each column is not a fixed length column following the last varying length column; wherein if said each column is a fixed length column following the last varying length column, the begin-adjustment having a value comprising the length of said each column and any fixed length columns between said each column and an ending position of the entry; and wherein the starting position is based on the offset-value of the offset of the particular offset array that is specified by the offset-array-number of the begin-offset that is associated with the particular column in the column-extraction-table, and the length of any fixed length columns between the predecessor varying length column and the particular column that is specified in the begin-adjustment.

20. The article of manufacture of claim 17, further comprising:
    computer usable program code for determining a length of the particular column based on the offset-value of the offset associated with the predecessor varying length column, the offset-value of the offset associated with the particular column, and the length of any fixed length columns between the predecessor varying length column and the particular column;
    wherein said computer usable program code for accessing information in the particular column is also based on the length of the particular column.

21. The article of manufacture of claim 17, wherein said computer usable program code for building also builds the column-extraction-table comprising, for each column of the at least one entry, at least one offset-array-number specifying at least one offset of the offset array, respectively, associated with said each column of the at least one entry;
    wherein the starting position and a length of the particular column are based on at least one offset-value of at least one offset of the particular offset array that is specified by the at least one offset-array-number associated with the particular column in the column-extraction-table, wherein the particular column is also accessed based on the length of the particular column.

22. The article of manufacture of claim 21 wherein the at least one offset-array-number comprises a first offset-array-number, a second offset-array-number and a third offset-array-number, the starting position of the particular column being based on the first offset-array-number, and the length of the particular column being based on at least one of the offset-value of the offset specified by the second offset-array-number and the offset-value of the offset specified by the third offset-array-number.

23. The article of manufacture of claim 17, further comprising:
    computer usable program code for generating one or more instructions to perform said accessing.

24. The article of manufacture of claim 23 further comprising:
    computer usable program code for executing at least a subset of said one or more generated instructions.

25. The article of manufacture of claim 17, further comprising:
    computer usable program code for building at least one comparison-table for the at least one entry and another entry, the at least one comparison-table comprising at least one offset-array-number; and
    computer usable program code for comparing the particular entry with another particular entry based on the at least one offset-array-number of the at least one comparison-table and the offset arrays of the entries.

26. The article of manufacture of claim 17, further comprising:
    computer usable program code for building a comparison-table defining groups comprising one or more adjacent columns of the at least one entry, and another comparison-table defining groups comprising one or more adjacent columns of another entry of another set of entries, such that a last group has up to one of the varying length columns, and each of the other groups comprise one varying length column, and the one varying length column is a last column of said each of the other groups; and
    computer usable program code for comparing the particular entry with another particular entry of the another set of entries based on one or more of the groups of the comparison-table and the another comparison-table.

27. The article of manufacture of claim 17, further comprising:
    computer usable program code for building a comparison-table to define groups of one or more columns of the set of entries, the comparison-table comprising at least one offset-array-number specifying at least one offset, respectively, of the offset array, and another comparison-table to define groups of one or more columns of another set of entries, the another comparison-table comprising at least one offset-array-number specifying at least one offset of an offset array of the another set of entries;
    computer usable program code for determining a length of one group of the groups of the particular entry based on the comparison-table and the offset-values of the offsets of the offset array of the particular entry specified by the at least one offset-array-number of the comparison-table, and a length of one group of the groups of another particular entry of the another set of entries based on the another comparison-table and offset-values of the offsets of the offset arrays of the another particular entry specified by the another comparison-table; and
    computer usable program code for comparing the one group of the particular entry and the one group of the another particular entry using a padding character if the length of the one group of the particular entry is different from the length of the one group of the another particular entry.

* * * * *